US005444676A

United States Patent [19]

Balsamo et al.

[11] Patent Number: 5,444,676

[45] Date of Patent: Aug. 22, 1995

[54] AUDIO MIXER SYSTEM

[76] Inventors: Nicholas Balsamo, 72 Butterfield Dr., Greenlawn, N.Y. 11740; Michael H. Brauer, 201 W. 89th St., Apt. 8E, New York, N.Y. 10024

[21] Appl. No.: 313,814

[22] Filed: Sep. 28, 1994

[51] Int. Cl.[6] .............. H04B 1/20

[52] U.S. Cl. .............. 369/4; 381/119

[58] Field of Search .............. 369/4, 3, 5, 2; 381/119, 58, 80, 81, 87, 88; 360/22, 24, 18

[56] References Cited

U.S. PATENT DOCUMENTS

| | | | |
|---|---|---|---|
| 4,201,895 | 5/1980 | Hill, Jr. | 369/4 |
| 4,635,288 | 1/1987 | Stadious | 381/119 |
| 4,879,751 | 11/1989 | Franks et al. | 381/119 |
| 5,170,381 | 12/1992 | Taylor et al. | 369/4 |
| 5,175,771 | 12/1992 | Zampini et al. | 381/119 |
| 5,197,047 | 3/1993 | Witheridge et al. | 369/4 |
| 5,230,024 | 7/1993 | Zampini et al. | 381/119 |
| 5,257,317 | 10/1993 | Stavrou | 381/119 |

OTHER PUBLICATIONS

Sound Mixing Device (PCT/US91/01365) Sep. 5, 1991 WO 91/13497.

Digital Audio System for Professional Use, National Technical Report, vol. 26, No. 6, Dec. 1980.

*Primary Examiner*—Georgia Y. Epps
*Assistant Examiner*—Tan Dinh
*Attorney, Agent, or Firm*—Ronald P. Kananen

[57] ABSTRACT

The audio processing system for use in the mix down and mastering phases of professional audio recording includes: an audio patchbay unit, a logic control unit, a power supply unit, and an audio processing unit. The patchbay unit couples the system to a mix console and effects equipment. The audio processing system includes several balanced stereo paths which can be selectively coupled in parallel and in series. Each audio path includes at least two insert points which can be selectively inserted or removed from the signal path. Switches and indicators, controlled by the logic control unit are designed to reconfigurable. These switches and indicators are included on control panels which are located either on the audio processing unit or the mix console. CMOS components minimize the introduction of noise.

28 Claims, 18 Drawing Sheets

AUDIO MIXER SYSTEM

FIELD OF THE INVENTION

This invention relates to an audio processing system for use in professional audio recording. More particularly, it relates to an audio processing system for enhancing the initial recording, the mix down and the mastering phases of professional multitrack recording.

BACKGROUND OF THE INVENTION

Since the advent of the first phonographic recordings, audio reproduction has enjoyed virtually exponential growth in quality and complexity. The increasing diversity of audio processing equipment continues to expand the technological limits on the quality of audio recording. Developments in digital recording and processing, improvements in noise reduction, and refinement of filtering techniques are just examples of the increased technological capabilities of the professional audio recording field. As these advancements take place, it becomes increasingly apparent that the role of the individuals who operate this equipment has changed. Instead of merely capturing the work of the artist, these individuals contribute in creating the sound which is actually heard by the listener.

In a typical professional recording, various artists are recorded on individual tracks in a recording studio. A complicated arrangement, such as a classical music performance, might include scores of separate tracks. As illustrated in FIG. 1, after each track has been recorded, the recorded tracks (from VTRs 1 to N) are "mixed down" to a master multitrack recording on a master VTR. The master recording can be used in a variety of ways. For example, a two channel stereo master recording may be reproduced onto phonographs, compact disks, or tapes. Alternatively, a multitrack recording may be mixed with video signals for applications in television and film.

Typically, recording, mix down and mastering are performed with a large mixer console, such as those offered by SSL and Neve. As illustrated in FIG. 1, a mixer 70 generally includes several inputs 10 that are each coupled to recorders 20 which provide the prerecorded audio tracks. Each track is assigned a separate audio channel which can be processed with individual controls. For example, the level of each channel can be faded up or down with individual fader controls, or selected frequency ranges boosted or cut.

The output of the prerecorded audio channels is coupled to a smaller number of buses. For example, these channels may be mixed together onto two buses which form stereo channels. These stereo channels can be processed in a mixer 70 and output to a master recorder 30. The mixed signals can be monitored throughout this process with monitoring devices 40. In this way, each of the audio channels are mixed together to produce a master recording.

The mixer consoles available today offer the basic feature of mixing down a relatively large number of audio channels. Additionally, they offer, to varying degrees, other capabilities intended to enhance the mastering process. For example, the SSL 4000 console includes a limiter/compressor which may be used to narrow the dynamic width of the output channels. This feature is useful in limiting the broad range of an original recording, such as a classical score, to one which is better suited to the equipment available to most consumers.

Within this basic framework, there are a seemingly endless number of peripheral devices, often referred to as "outboard equipment," which can be used to modify the sound originally recorded on the individual tracks before they reach the master recording. These devices such as the effect module 50 shown in FIG. 1, can be used to supplement or replace the processing capabilities of the mixer console, or can provide various "effects" otherwise unavailable in FIG. 1. For example, if the operator is dissatisfied with the quality of the product from the compressor on a console, a selected channel can be output from the mixer, passed through an external compressor, then returned back to the mixer console. Other devices can be used to boost or cut other selected frequencies or channels. Additional effects can be introduced in a similar manner, such as feedback and rhythmic modification of amplitude.

The mixing consoles and effects equipment available provide a vast number of combinations by which individual audio tracks can be modified during the mix down and mastering phase. Consequently, it is to be expected that the individuals responsible for this part of the recording process play an important role in creating an unique master recording, as opposed to merely reproducing the sounds of the original performers. Indeed, it is typical that given the same set of original tracks, these individuals working alone produce master recordings which are dramatically different.

While the large amount of equipment available enhances the creative aspects of mix down and mastering segments, the resulting complexity of the options available, ironically, can impede the recording process. On a basic level, the various possible combinations of effect devices encourage experimentation by the engineer. Accordingly, one is tempted to try different types of effects inserted at different points along the signal paths leading from the original individual tracks to the master output paths. However, each time a different combination is attempted, it becomes necessary to physically change the connections coupling the outboard equipment with the mix console. Thus, it becomes time consuming for the operator to try different combinations, which translates into greater total expense. It also becomes difficult for the engineer to monitor the differences between various combinations. In that these differences may be difficult to detect, an inability to quickly toggle among the combinations renders it difficult for even the experienced engineer to discern the preferred set-up. Moreover, these changes are difficult to predict, since even a familiar piece of equipment may affect the overall mix in a different manner when used in combination with other equipment.

In order to circumvent the need to change the wiring configuration each time a new combination is to be tried, it is possible to utilize extra channels on the mix console to insert the effects at different points in "submixes,"[that is combinations of input channels linked together, for example, in a daisy chain. For example, channels 1, 2, and 3, might be combined in series on the mixer to form a mixed channel input to channel 4. This might correspond to recordings of all the percussion instruments. Instead of simply combining channels 1, 2, and 3 on the master buses and then processing them along with other channels, the engineer alternatively can couple the combined submix to a compressor and return the output to channel 5 of the mixer. This permits a compressor to be used with selected channels rather than merely individual ones or the entire mix. The operator can then evaluate how the submix of channel 4 combines with the entire mix in comparison with the submix of channel 5.

While such a technique provides a partial solution to the drawbacks associated with changing wiring configurations, it is limited in several respects. For example, this technique requires channels of the mixer to be taken away for use in the standard mixing process. Another drawback is that this technique increases the overall signal path in the mix console over which the original recorded tracks travel before reaching the master record. Thus, there is a greater risk that noise present in the system will be recorded onto the master track. Moreover, it is not possible to accomplish this technique without particularly large mix consoles. For example, it is usually necessary to use a master bus which has more than two paths, such as in a video mixer. Since such consoles are expensive, they are available at only certain studios, and so the universe of locations at which the engineer can apply this technique is limited. Further, since many of the large mix consoles with which this technique may be used are not intended for high quality professional audio recording, but rather are more often used in conjunction with video applications, it is necessary to incur a certain amount of sound degradation when using such mix consoles.

The availability of a wide selection of recording equipment impedes the recording process in another, related aspect. Since the recording equipment available differs dramatically with respect to mixing consoles, it is common that mix engineers develop preferences for particular equipment based on the quality of the product and ease in use. These preferences may also arise from familiarity developed with frequent use of certain equipment. As a result, such individuals attempt to work with studios at which the preferred equipment is available. This enables the engineer to more quickly obtain the type of sound which he prefers. Consequently, the possible "matches" between the mix engineers and recording studios are reduced, thereby limiting the supply of an essential element of the recording process.

Similarly, the preferences developed by mix engineers with respect to outboard equipment may limit their experimentation with other devices. Due to the time-consuming efforts required to combine outboard equipment with other elements of the recording system, many engineers prefer to rely on the type of equipment with which they are accustomed, often bringing their own outboard equipment with them when undertaking a mix down.

In view of the foregoing, there is the need for a convenient and flexible system to expedite the initial recording, the mix down, and the mastering phases of the recording process. There is a need for a system which provides the engineer with more predictability and control. More particularly, there is a need to provide a system which can easily be combined with a wide variety of conventional mix consoles and outboard equipment so as to enable a mix engineer to more readily monitor and predict the relative improvement in sound quality offered by different set-ups. There is a further need to accomplish these requirements without introducing unwanted noise and distortion into the recording system. There is still another need to provide the foregoing in a manner which can be adapted to particular operator's preferences and which can be used with a variety of existing audio devices.

SUMMARY OF THE INVENTION

It is an object of this invention to meet these and other needs with an audio processing system comprising: an audio patchbay unit, a logic control unit, a power supply unit, and an audio processing unit. The patchbay unit includes a plurality of input terminals for receiving audio signals from one or more audio sources, and includes a plurality of return terminals for receiving return audio signals from one or more external processing devices. It further includes a plurality of output terminals for providing processed audio signals, including send terminals for providing audio signals to the external processing devices.

The audio processing unit includes a plurality of audio signal paths each having an input portion coupled to a corresponding number of the input terminals on the patchbay, an insert portion, and an output portion coupled to a corresponding number of the output terminals on the patchbay. Each output portion is selectively coupled to each input portion through a first plurality of logic controlled switches, whereby each of said plurality of audio signal paths can be looped back in series with one or more others of said plurality of audio signal paths. At least one additional audio signal path is arranged in parallel with each insert portion of said plurality of audio signal paths whereby at least one audio insert point is provided. A second plurality of logic controlled switches is arranged in series with each additional audio signal path and each insert portion of said plurality of audio signal paths.

Logic control means for providing logic signals which selectively open and close each of the first and second plurality of logic controlled switches in response to the operation of a corresponding number of switch operating members are located in the logic control unit.

According to one aspect of the invention, the system provides for selection of level adjustment before or after the insert points of each signal path. Alternatively, the pre-insert and post-insert signals can be calibrated.

According to another aspect of the invention, each audio path is a balanced stereo audio path.

According to still another aspect of the invention, the system includes two insert points for each audio path.

According to yet another feature of the invention, the logic control means includes three logic circuits, one for controlling switches and relays in the audio processing unit, one for determining the position of mechanical switches, and one for providing driving signals to light emitting diodes associated with each of the mechanical switches.

According to a further aspect of the invention, the system includes display panels located on an audio mix console or alternatively is fully contained in a rack mounted configuration.

According to still a further aspect of the invention, the logic control means are programmable so that each switch, LED and relay controlled thereby can be assigned different functions.

According to yet another aspect of the invention, low noise components are used to ensure "transparency" in the system.

DETAILED DESCRIPTION OF THE DRAWINGS

Figure 1:
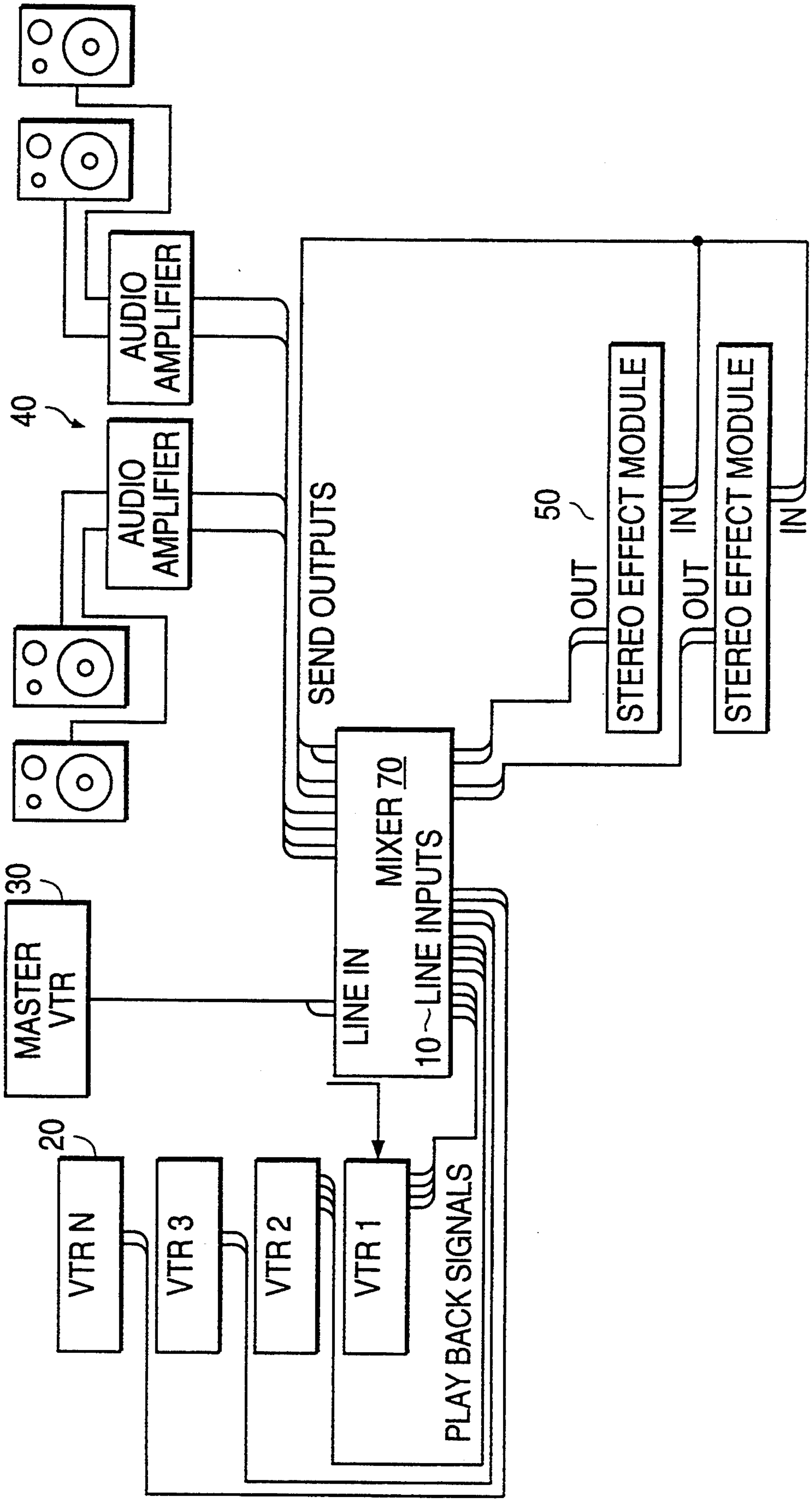
FIG. 1 PRIOR ART
FIG. 1 is a block diagram showing a conventional system for mix down and mastering.
Figure 2:
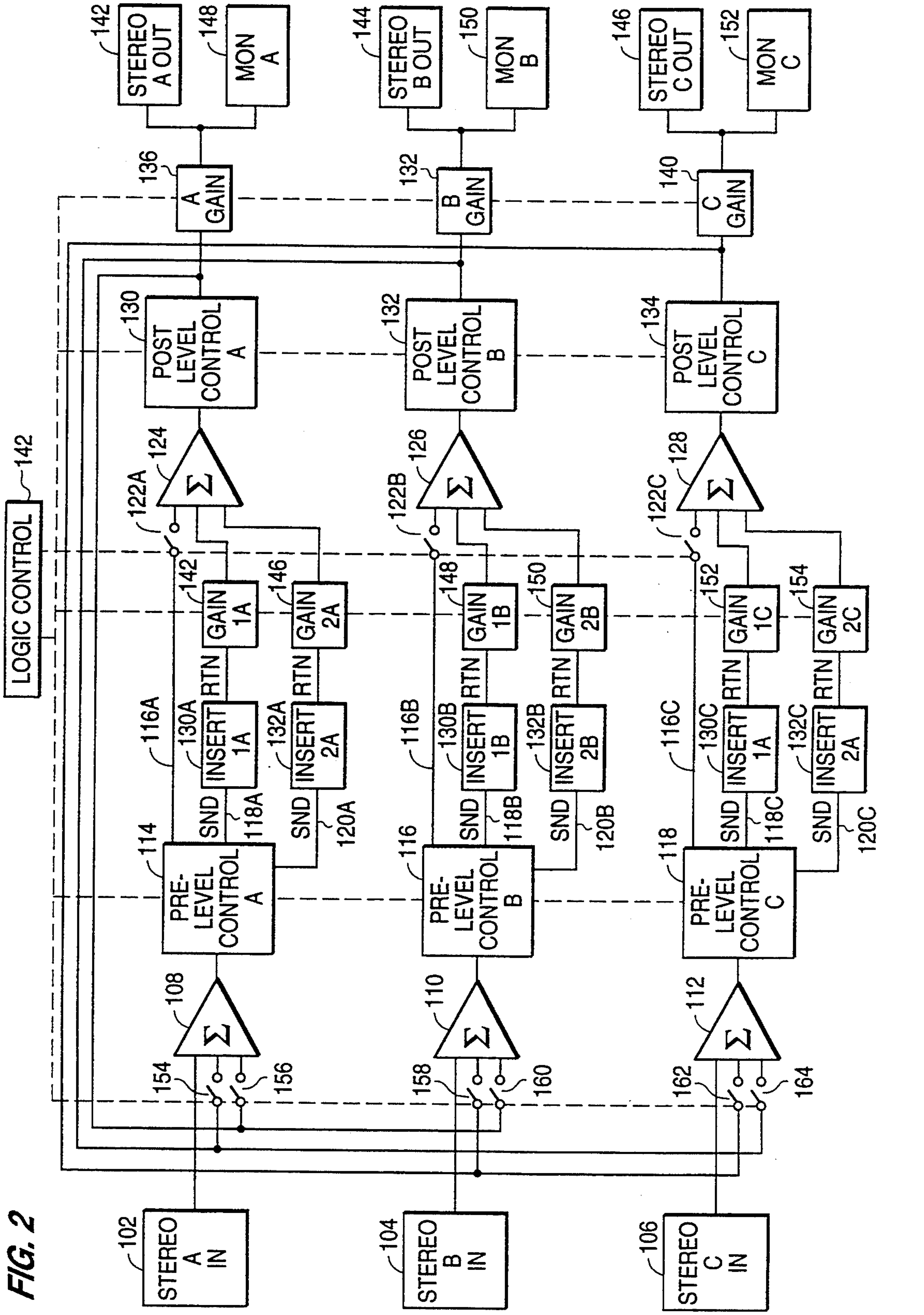
FIG. 2 is a simplified block diagram of an example of an audio processing system according to the invention.

FIG. 2 is a simplified block diagram showing an example of the invention in which three stereo channels A, B and C are processed. In this drawing, solid lines represent stereo audio signal paths, while dashed lines represent logic controlled signals. It will be apparent to those skilled in the art that while three stereo channel paths are discussed, fewer or more channels could be used without departing from the spirit or scope of the invention.

As shown, three stereo inputs 102, 104 and 106, each consisting of a left and right channels, are provided to the system. These inputs are each respectively provided to a summing amplifier 108, 110, 112 which selectively combines the input audio signal with post-processed signals from the other channel paths, as described below.

The outputs of the summing amplifiers 108, 110, 112 are each respectively input to a prelevel control circuit 114, 116, 118. The signals from these circuits are then provided along three respective separate signal paths 116, 118, 120. One path 116 leads through a switch 122 to a second set of summing amplifiers 124, 126, 128. Another path 118 leads through a first set of insert points 130A, 130B, 130C, one for each channel. A third path 120 leads through a second set of insert points 132A, 132B, 132C, again, one for each channel.

In this way, the summed input signals, that is the signals from the first set of summing amplifiers, are each available to terminals marked "SND" by which the signals are provided to external equipment, such as the effects devices described above. Once processed externally to the system, the signals are returned through a set of return terminals, labelled "RTN," associated with the processing system. The returned signals are each respectively coupled to a second set of summing amplifiers 124, 126, 128 through gain control circuits 112, 146, 148, 150, 152, 154. These gain control circuits are controlled by logic control signals which enable the insert signals returned from peripheral equipment to be selectively added or removed from each stereo signal, A, B or C.

Switches 122A, 122B, 122C are shown between the prelevel control circuits 108, 116, 118. These elements are merely symbolic of the selective control capabilities of the system. These switches represent relays which, in conjunction with the gain control for each return signal, permit the user to output the signals from the first set of summing amplifiers either with or without inserting one or both of the return signals.

The output of each of the second set of summing amplifiers is respectively provided to post level control circuits 130, 132, 134. As are the prelevel control circuits 114, 116, 118, the postlevel control circuits 130, 132, 134 are coupled to the logic control circuit 142. In this way, the operator can selectively choose to adjust the gain before or after the insertion points. Alternatively, the operator can choose to select a balanced input and output by setting the gain of both the prelevel control circuits 114, 116, 118 and the postlevel control circuits 130, 132, 134 to unity.

The outputs of the postlevel control signals are further provided to gain control circuits 136, 138, 140. These circuits provide the capability of further adjusting the overall gain of each stereo signal A, B and C. The outputs of these circuits are provided to a set of stereo output terminals 142, 144, 146 and stereo monitor terminals 148, 150, 152.

It is a feature of the invention that each stereo signal A, B and C can be selectively looped back to the inputs of the other stereo channels, thereby enabling the operator to immediately change the signal path as desired. With the insert points, the operator can, for example, experiment with several different combinations of the stereo channels A, B and C. Representative of this feature, in FIG. 4, the outputs of each post-level control signal are looped back to the inputs of the first set of summing amplifiers 108, 110, 112 through switches 154, 156, 158, 160, 162, 164. These switches represent relays controlled by the logic control circuit 142.

Figure 3:
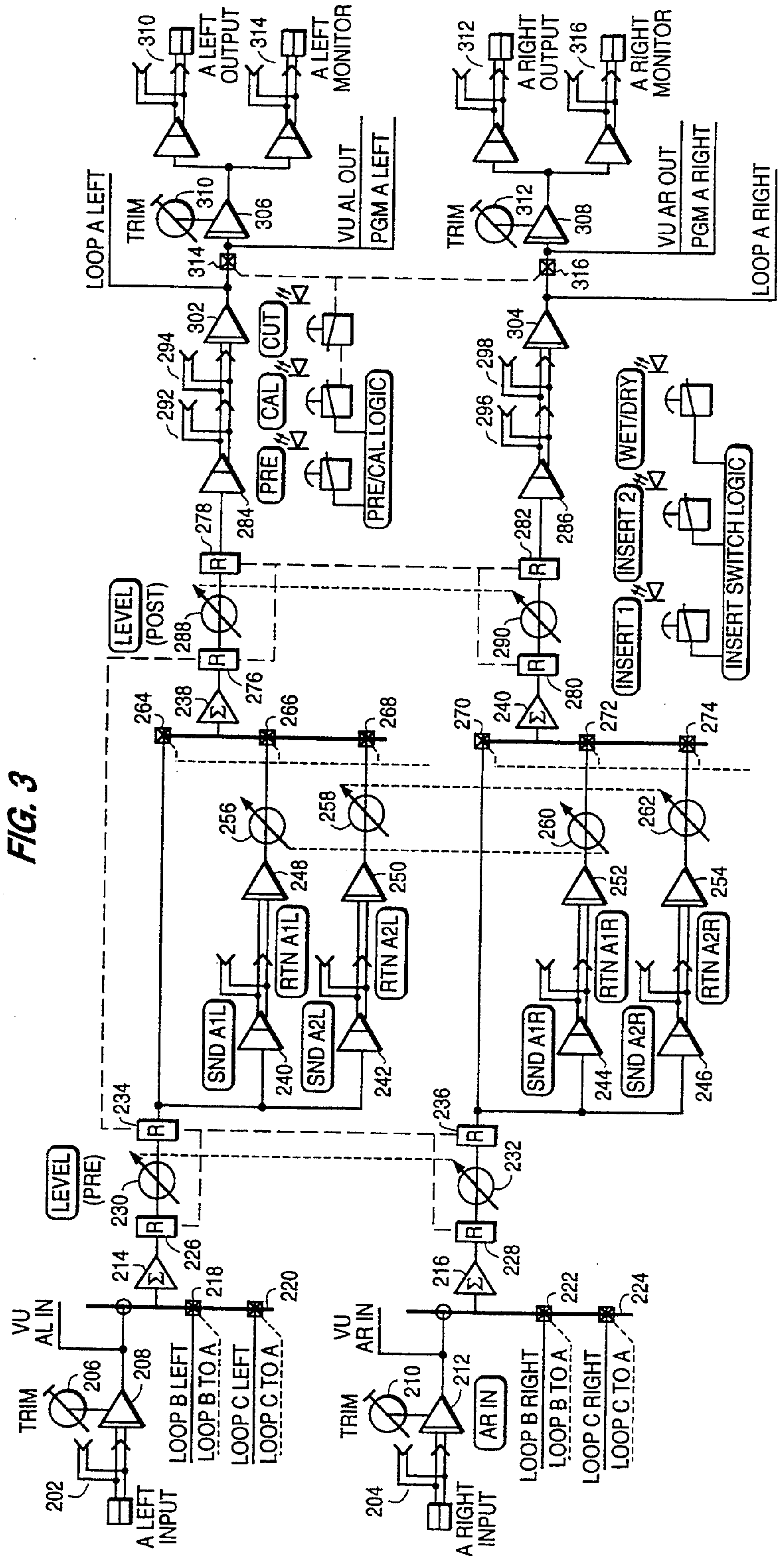
FIG. 3 is a more detailed representation of one stereo channel path of the example of FIG. 2.

FIG. 3 is a more detailed representation of one stereo signal path of the three stereo signal paths shown more generally in FIG. 2. In this example, each stereo signal consists of balanced left and right channels. As in FIG. 2, audio signal paths are drawn in solid lines while logic signals are drawn in dashed lines.

In FIG. 3, left and right input terminals 202, 204 are provided to receive input signals. These channels are provided to balanced input amplifiers 208, 212. As shown, the gain of these balanced input amplifiers 208, 212 may be adjusted with trim potentiometers 206, 210. The output of the balanced input amplifiers are respectively coupled to 214, 216 inverting combining amplifiers. In addition to the channel input, these combining amplifiers further receive selected outputs from the other channels as mentioned above in reference to FIG. 4. As shown, inputting of the "looped in" signals is controlled by logic controlled crosspoint switches 218, 220, 222, 224.

The outputs of the combining amplifiers 214, 216 are coupled through logic controlled relays 226, 228, 234, 236 and prelevel control potentiometers 230, 232 to a second set of inverting combining amplifiers 238, 240. As shown, the signal path leading directly from the relay located after the prelevel potentiometer control is in parallel with two insert signal paths. These insert signal paths include balanced output amplifiers 240, 242, 244, 246 coupled to send terminals (labelled SNDA1L, SNDA2L, SNDA1R, SNDA2L). Return terminals (labelled RTNA1L, RTNA2L, RTNA1R, RTNA2R) are each coupled through a balanced input amplifier to a balanced input amplifier 248, 250, 252, 254.

The respective outputs of these balanced input amplifiers 248, 250, 252, 254 are coupled to logic controlled trim potentiometers 256, 258, 260, 262 as illustrated. Together with the logic controlled relays 234, 236 and crosspoint switches 264, 266, 268, 270, 272, 274, this arrangement permits one to selectively add or remove the insert signals to the overall signal path. The generation of the logic control signals are represented by switches, labelled INSERT 1, INSERT 2, and WET+DRY. The signals from the first two switches determine which insert signals are active. The third determines if the output signal includes the insert signals (WET) or does not include the insert signals (DRY). Light emitting diodes (LEDs) are provided with each switch to visually indicate the state of these signals.

The outputs of these circuits are respectively provided to second inverting combining amplifiers 238, 240. These amplifiers are selectively coupled to balanced input amplifier 284, 286 and trim potentiometers 288, 290. Logic control signals are used to select between pre-insert or post-insert level adjustment or to select balanced input and output by alternately removing or inserting the potentiometers from the signal path with relays 276, 278, 280, 290. This selection is implemented respectively with the logic signals generated by the switches labelled PRE and CAL. Again, LEDs are included with these switches to indicate their respective logic state.

The signals output from the combining amplifiers 238, 240 are provided to balanced output amplifiers 284, 286. The outputs from these amplifiers are provided to two output terminals 292, 294, 296, 298 as shown, and are further coupled to balanced input amplifiers 302, 304. The outputs of the balanced input amplifiers 302, 304 are selectively looped back to the other stereo channel inputs, depending on the state of crosspoint switches 218, 220, 222, 224. These outputs are further provided to adjustable gain amplifiers 306, 308 (adjusted with trim potentiometers 310, 312) across a signal path controlled by FET switches 314, 316. These switches selectively open and close the signal paths based on the operation of a mechanical CUT switch. Similar to the mechanical switches referred to above, a corresponding LED is provided to indicate the state of the CUT switch.

Through these adjustable amplifiers 306, 308, both left and right signals are provided to output terminals 310, 312 and monitor terminals 314, 316. The trim potentiometers 310, 312 may be manually adjusted by any technique known in the art. In a preferred embodiment, they are adjusted to vary the gain by ±3 dB by adjusting the position of screws located on a front panel control.

FIG. 3 further indicates where signals labelled VUAL IN and VUAL OUT are obtained from the signal path. These signals are used to detect signal levels which is displayed on a meter as described below. PGM signals are similarly obtained at the points indicated in the drawing.

Figure 4:
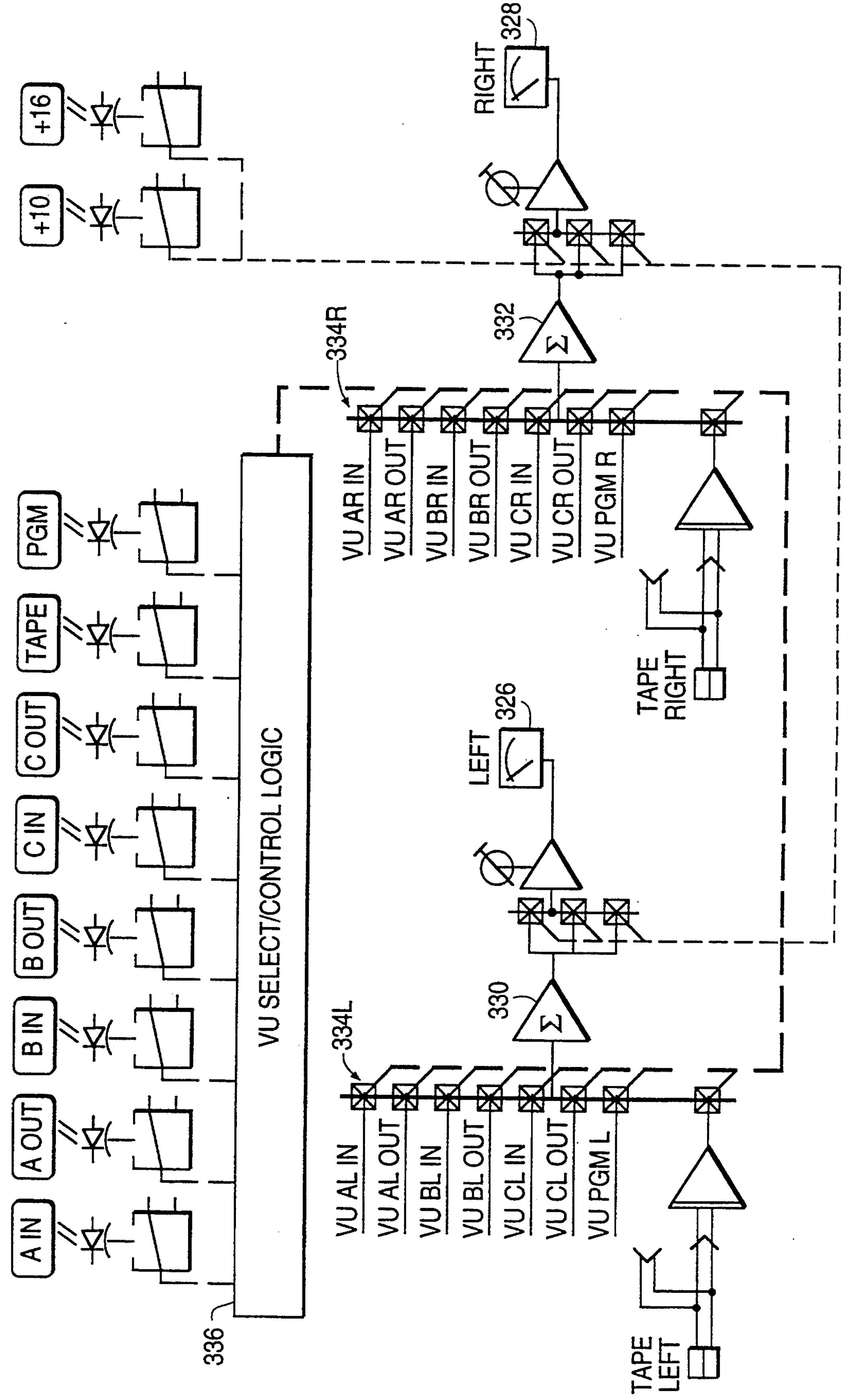
FIG. 4 is a representation of logic and display circuits for VU meter assemblies according to one aspect of the invention.

FIG. 4 more particularly illustrates logic and display circuits for VU meter assemblies 326, 328 which are included in the embodiment of the invention. As shown, the IN and OUT signals for each stereo channel A, B and C, obtained from the points indicated in FIG. 3, are coupled to two combining amplifiers 330, 332, one for left and one for right channels. Additionally, audio signals from stereo tape input terminals are additionally coupled to the combining amplifiers.

Each input is controlled by a logic controlled CMOS crosspoint switch (indicated generally by reference numerals 334L and 334R). These crosspoint switches are operated according to logic control signals supplied from a VU select and control circuit 336. These signals are generated in response to the operation of a plurality of mechanical switches, labelled A IN, A OUT, B IN, B OUT, C IN, C OUT, TAPE and PGM, which correspond respectively to the stereo signals VU A IN, VU A OUT, VU B IN, VU B OUT, VU C IN, VU C OUT, VU TAPE, and VU PGM. When the VU select and control logic circuit 336 detects that one of these switches is closed, it issues a logic signal which closes the path between the corresponding signal and the combining amplifier. A control signal is also provided to illuminate the corresponding LED.

Figure 5A:
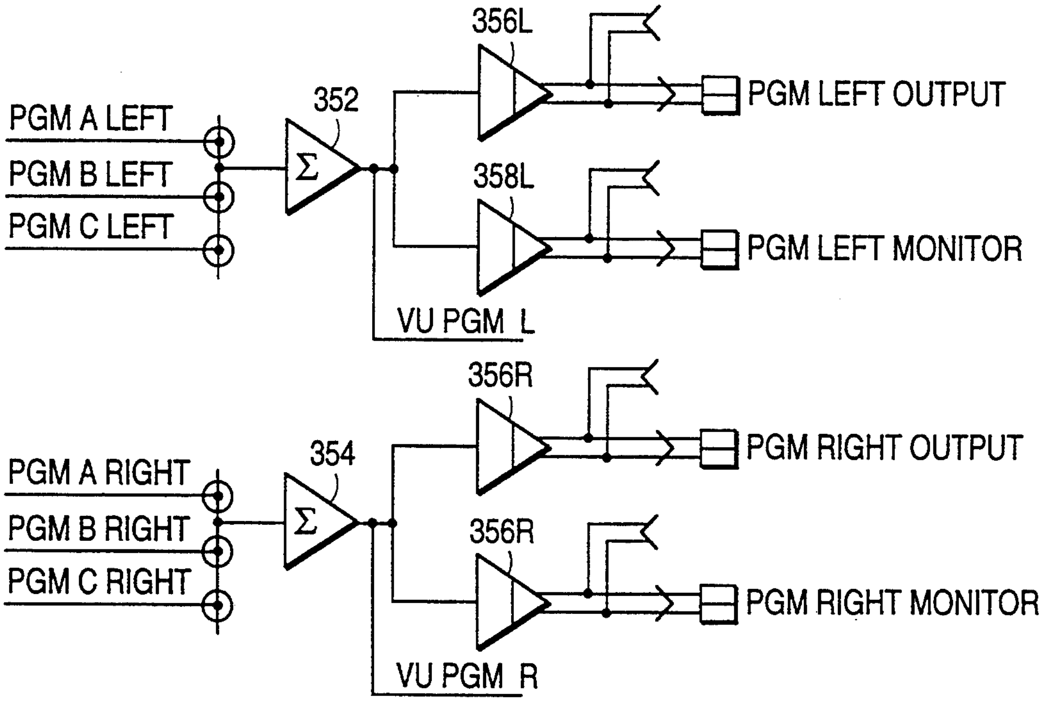
FIG. 5A is an illustration of audio paths for PGM signals obtained from the audio paths shown in FIG. 2.

FIG. 5A shows the audio path for a plurality of PGM signals. These signals are obtained from the point in the audio path of each balanced stereo channel as shown in FIG. 3. As shown, the PGM signals for each channel are summed with combining amplifiers 352, 354 and the outputs for both left and right channels are each coupled to two balanced output amplifiers 356L, 358L, 356R, 358R. These amplifiers supply stereo signals to a set of PGM output terminals and monitor terminals. The output of both combining amplifiers 352, 354 also supply the VU PGM stereo signal referred to in FIG. 3.

Figure 5B:
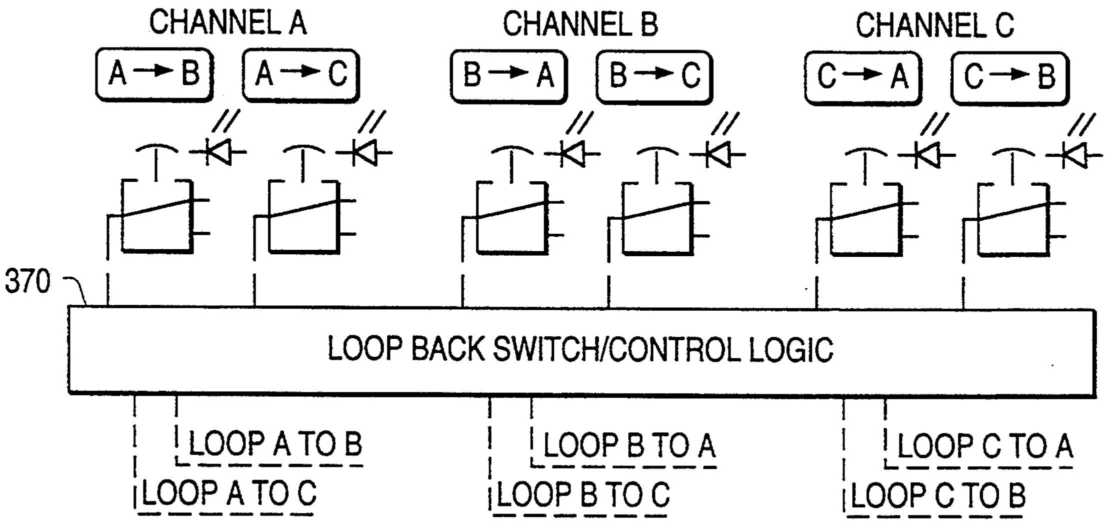
FIG. 5B is a more detailed illustration showing looped back audio signals.

FIG. 5B more particularly illustrates the loop back switching function generally referred to above. As shown, six mechanical switches labelled A→B, A→C, B→A, B→C, C→A, and C→B are coupled to a loop back switch and control logic circuit 370. This circuit 370 detects the position of the mechanical switches, and in response controls the state of the logic controlled crosspoint switches arranged for each channel as shown in FIG. 5B, thereby determining which signals are input to the signal path of each channel. In response to the detected position, LEDs associated with each of these mechanical switches are illuminated when the corresponding switch is closed.

The output of each combining amplifier is supplied to a series of logic controlled CMOS switching circuits coupled to a trimmable amplifier. The outputs of the amplifiers are supplied to VU mechanical meters.

Figure 6A:
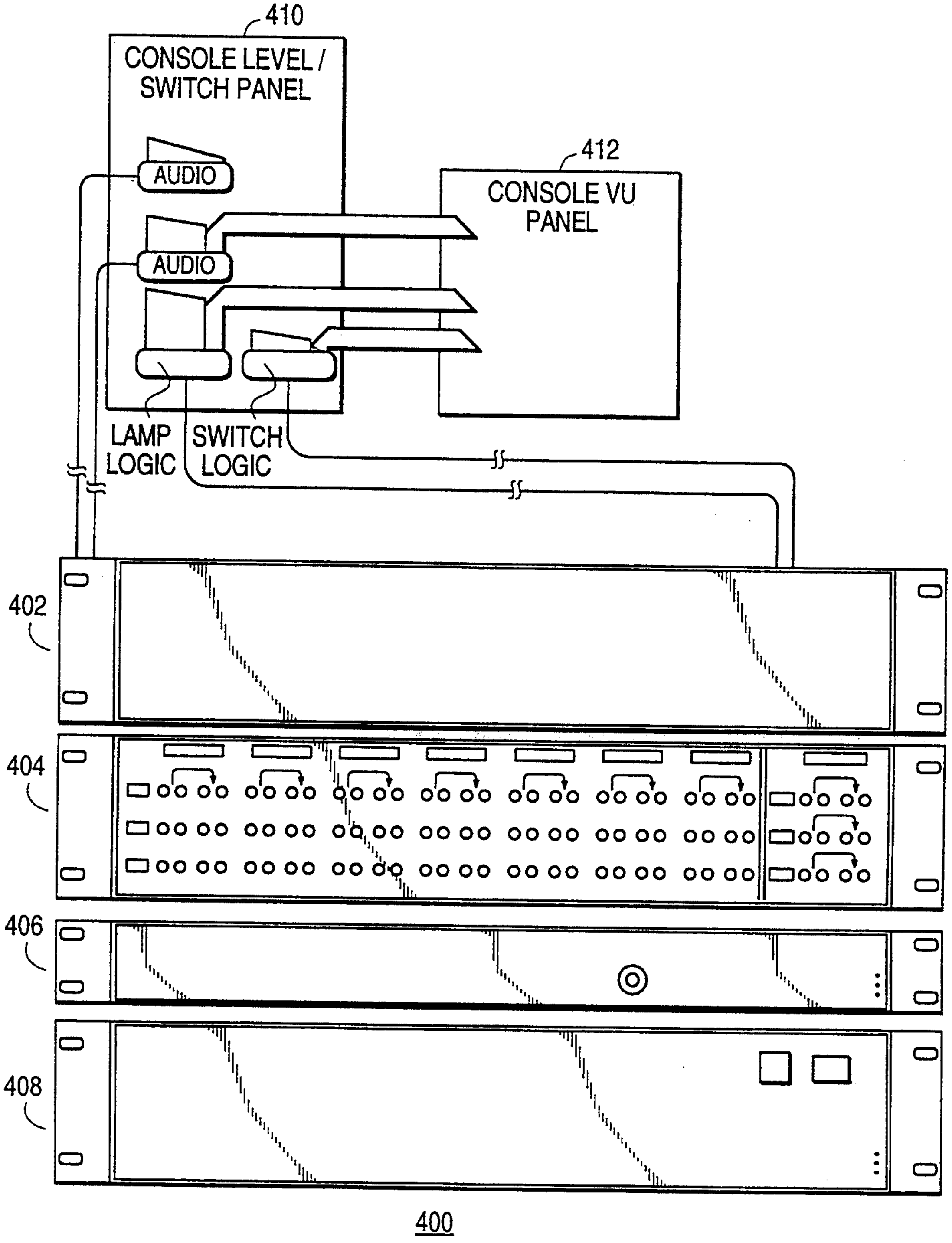
FIG. 6A is a front view of an audio processing system according to a first embodiment of the invention.

FIG. 6A is a front view of a processing system 400 according to a first embodiment of the invention. This embodiment includes four separate, integrally formed units designed to be rack-mounted in a standard-sized rack (19" wide, with ¾" unit intervals), and two panel assemblies designed to be incorporated onto an audio mix console.

As known in the art, most conventional "outboard equipment" used for audio recording in conjunction with a mixer is designed to be standard size so that it can be mounted in a standard vertical rack which is maintained in the vicinity of the mix console. Accordingly, each of the four units is 19" wide and has a height designed to conform with the standard unit interval (1U=¾"). As shown, each unit's face includes mounting brackets having four holes by which the unit can be attached to a mounting rack.

The system shown in FIG. 6A includes an audio processing unit 402, a patch bay unit 404, a logic control unit 406, a power supply unit 408, a first panel assembly 410 and a second panel assembly 412. The first and second panel assemblies are designed to be attached directly onto a mixing console 425, as illustrated in block diagram FIG. 6B.

The power supply unit 408 is a 2U rack unit that provides ±16 VDC and +5 VDC outputs via five pin XLR connectors (+16 VDC, −16 VDC, audio common, +5 VDC, +5 VDC common). With these connectors, the power signals are coupled to the audio processing unit 402 and the logic control unit 406.

The logic control unit 406 is a 1U rack unit which is operatively coupled to the audio processing unit 402. The logic control unit 406 contains programmable logic circuits (PALs) which receives switch contact information based on the operation of the switches on the console switch panel 410 and the console VU panel 412. The programmable logic returns LED logic control signals and CMOS and relay control logic to the audio processing unit 402 (which in turn is coupled to the console switch panel 410 and the console VU panel 412) . These signals provide the logic function referred to generally in FIGS. 2 and 3.

The patchbay unit 404 is a 2U rack unit that is provided with an array of audio jacks for interfacing with other devices such as a mix console 425 and external devices 430 in a recording and mixing system. As shown, each stereo path of the system referred to above in FIGS. 2 and 3 has corresponding terminals (two pairs each) for source, insert 1, insert 2, patch 1, patch 2, main output, and monitor output. Additionally master input output (I/O) terminals are provided for PGM, monitor and tape inputs and outputs.

The audio processing unit 402 according to this embodiment is a 2U rack unit that houses all the audio processing and routing circuitry, except the level control assemblies 410 and the VU meter assemblies 412. As referred to above, the switch members of the control panels 410 and 412 are operatively coupled with the logic control unit 406 either directly or via the audio processing unit 402 thereby indicating the desired setting of the system. The logic control unit responds to these signals by providing LED control signals which indicate the settings of the control switches, as explained in greater detail below.

Figure 7:
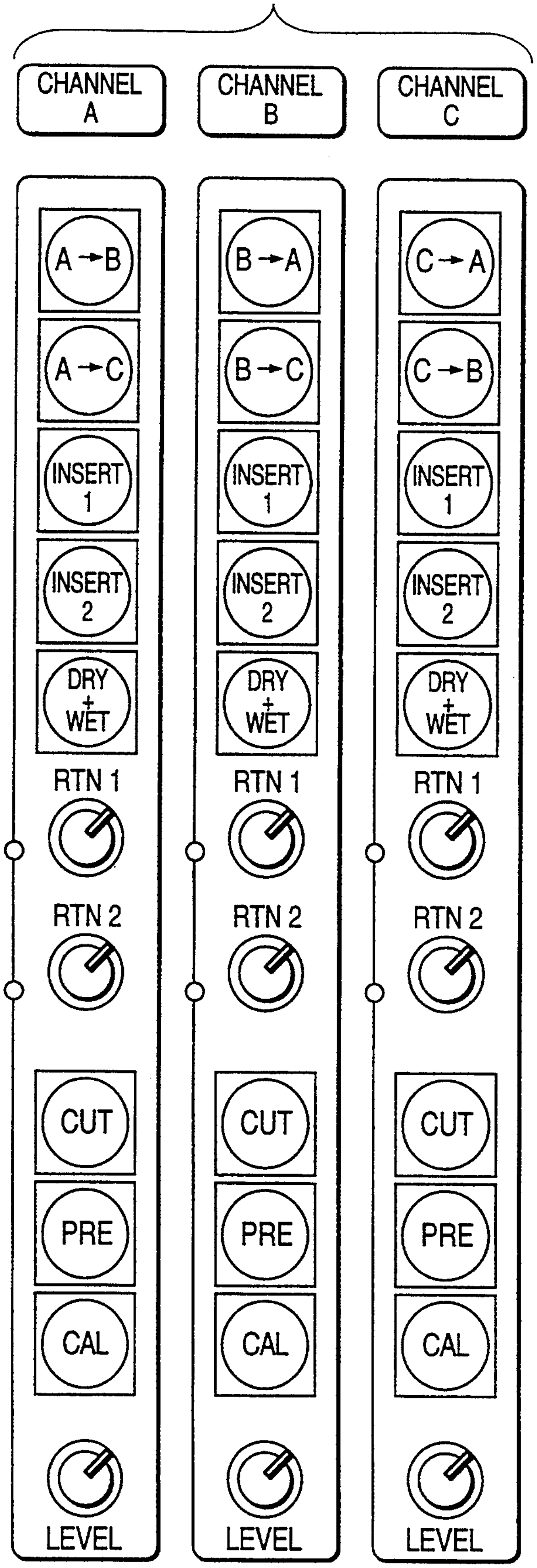
FIG. 7 is a more detailed view of the console switch panel referred to in FIG. 6A.

FIG. 7 is an example of the console switch panel referred to in FIG. 6A. This panel consists of three columns of switches and potentiometer control members, each column corresponding to one of the three stereo channels A, B, and C described with reference to FIGS. 2 and 3. Each column includes eight depressible switches which are labelled by function and are backlit by an LED. These LEDs are driven by lamp logic signals supplied from the logic control unit in response to the operation of the switches as illustrated in FIG. 5B. In this way, a visual indication of the state of the switches is provided to the operator.

The first two depressible switches in each column determine whether the corresponding channel's output is to be looped back to one or both of the other two channels. For example, channel A is provided with two switches labelled "A→B" and "A→C" which, when activated, route the output of channel A to the input of the selected channel where it is summed as shown in FIGS. 4 and 5A.

The third and fourth switches, labelled "INSERT 1" and "INSERT 2" control whether the input to the corresponding channel will be routed along the external path formed across the insert SEND and RTN audio jacks located on the audio patch bay. The fifth switch labelled "DRY+WET" determines whether the input to the corresponding channel should be directly output or coupled in parallel with the active insert paths.

By use of these switches, the operator can immediately change the signal paths in a variety of ways. For example, one can link channel A, B, and C in series by setting the "A→B" switch and the "B→C" switch to an active state. The operator could then monitor how the inclusion of up to six insert points along this path affect the overall signal, by operating the six insert switches. He can experiment with combinations of these six insert points, for example, removing both inserts associated with channel A by setting the "WET+ DRY" switch of channel A to "dry."

Many other combinations are possible. For example, the outputs of both channel A and channel B could be summed in parallel at channel C by activating the "A→C" and the "B→C" switch. The operator could then experiment with removing these signals from the channel C signal path or could experiment with the individual insert points.

It is a feature of the invention that the logic control unit is programmed according to techniques known in the art such that the operator cannot create a feedback loop. For example, if the "A→B" switch is active, the operator is unable to activate the "B→A" switch. In this way, unwanted outputs are avoided.

Each column includes three additional control switches which provide the functions previously referred to above. A "CUT" switch interrupts the signal path of the corresponding channel, thereby muting any active signal thereon. The "PRE" switch toggles controls the relays shown in FIG. 3 which determine which of the level control potentiometers are active, the ones located before the insert points of the signal path or the ones located after the insert points. The "CAL" switch sets the amplifiers on both sides of the insert points to unity and bypasses the level control potentiometers.

Each column of the control panel further includes three potentiometer control members corresponding to the potentiometers shown in FIG. 5A. These control members can be operated to adjust the level of the signals returned at insert points 1 and 2 and of the overall level of the channel.

Figure 8:
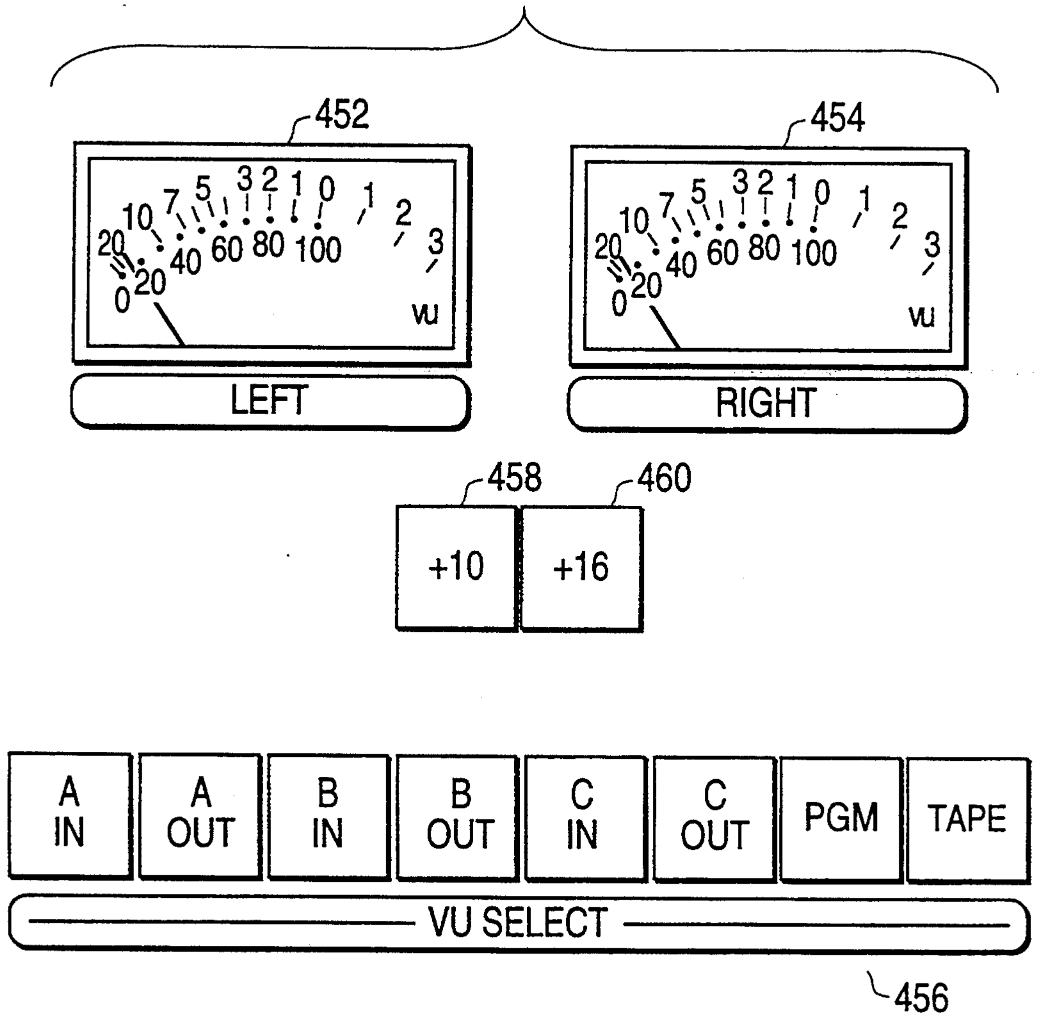
FIG. 8 is a more detailed view of the console VU panel referred to in FIG. 6A.

FIG. 8 is an illustration of the console VU panel generally shown in FIG. 6A. As shown, this panel includes two VU meter displays 452, 454 and a VU select panel 456 which determines the signal monitored by the VU meter displays. The VU select panel 46 includes backlit depressible switches similar to those of the console switch panel. These switches determine which signal is supplied to the meter, including that corresponding to the input and output of the three channels A, B, and C (A IN, A OUT, B IN, B OUT, C IN, and C OUT). In addition to these signals, one could choose to monitor the level of the program or tape outputs from the audio patch bay unit.

The console VU panel further includes two switches 458, 460 by which the operator can change the range of the VU meters so that the displayed 0 VU level corresponds to +10 dB or +16 dB. In this example, these switches are of similar structure as the VU select switches.

Figure 9:
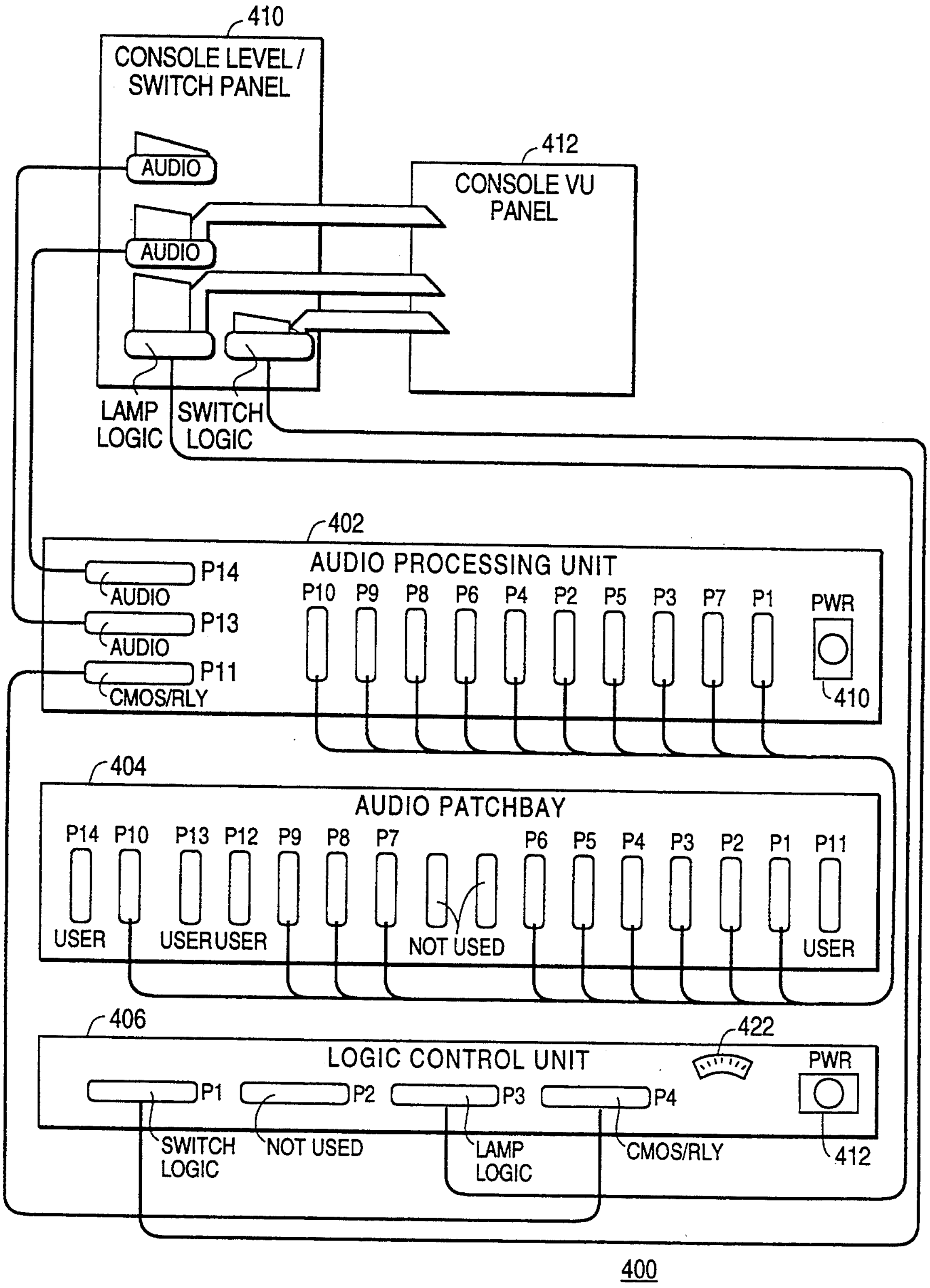
FIG. 9 is a rear view of an audio processing system according to a first embodiment of the invention.

FIG. 9 shows a rear view of this first embodiment of the invention shown in FIG. 6A, except the power supply unit has been omitted. This illustration more particularly defines the connectors by which each of the units of the system are coupled together. As shown, both the audio processing unit 402 and the logic control unit 406 include power terminals 410, 412. These terminals comprise XLR connectors which couple each unit to the power supply unit.

The logic control unit 412 further includes ports labelled P1, P2, P3, and P4. In this example, each port includes a D37 connector which couples the logic control unit with the audio processing unit and the console switch panel by either a ribbon cable or a jacketed multiconductor cable (depending on the required length of the cable). As shown, port P1 receives switch logic signals which indicate when the various switches located on the console switch panel and the console VU panel have been depressed. In response to these signals, the logic control unit outputs lamp logic signals (via port P3) which control the LEDs associated with each switch. The logic control unit also outputs control signals to the audio processing unit (via port P4) which control the state of the CMOS switches and relays located in the audio processing and routing circuity contained therein (and illustrated in FIGS. 2 and 3).

The various audio terminals shown on the front portion of the audio patchbay 404 are coupled to the audio processing unit 402 through the D25 connectors shown in FIG. 9. In this example, each D25 connector includes six balanced stereo audio paths. This diagram illustrates ten D25 connectors labelled P1 through P10. Thus, these connectors are capable of interconnecting sixty balanced audio paths between the audio processing unit 402 and the patchbay 404.

In this example, the audio processing unit 402 further includes two additional D25 connectors labelled P13 and P14 which couple the audio processing unit to the console switch panel. These interfaces couple the channel monitor signals and the master I/O signals (PGM, MON, TAPE) to the console switch panel 410 and the console VU panel 412.

Figure 6B:
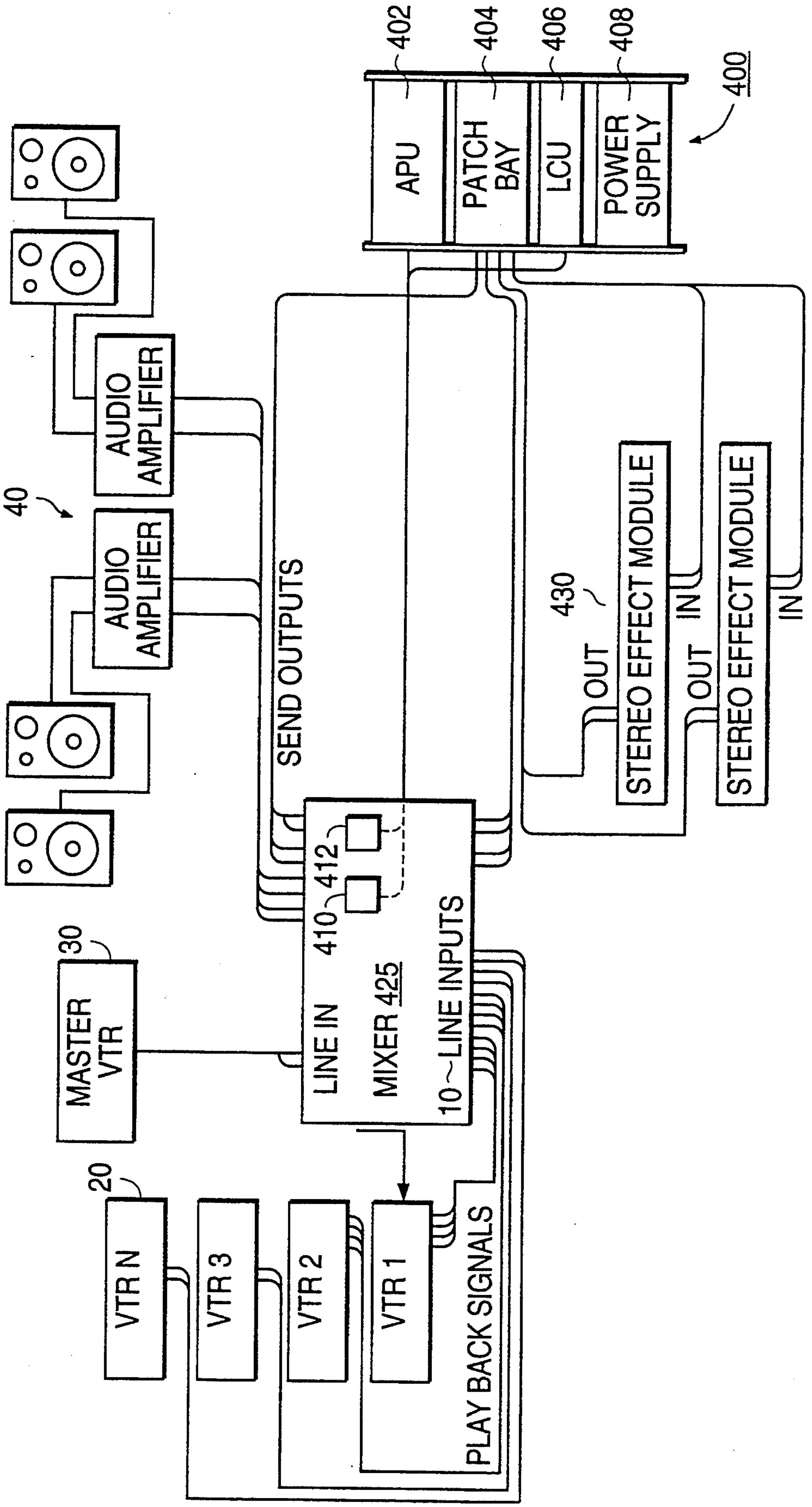
FIG. 6B is a block diagram showing a first embodiment of the invention in a mix down and mastering system.

It will be appreciated by those skilled in the art that this first embodiment of the invention is well suited for use in conjunction with currently existing audio mixing consoles. For example, this embodiment may be incorporated with a SSL model 4000 mix console as illustrated in FIG. 6B. According to this example, the power supply unit 408, the audio processing unit 402, the audio patchbay 404 and the logic control unit 406 are all mounted in a standard rack unit and coupled as described above. The two console panels 410, 412 are then incorporated on the master control panel of the mix console.

With such a system, the mix down and mastering segments of audio recording are facilitated. In particular, selected submixes can be created using the three stereo channels as opposed to the one stereo master bus generally available on standard audio mix consoles. Alternatively, the mix down signal can be coupled to effect inserts 430 which can more easily be monitored.

For example, one might wish to pass selected, mixed signals through a limiter/compressor located on the mix console in order to narrow the dynamic bandwidth of the master signal. However, it might be found that this unduly minimizes the sound of the bass drum. Using the system according to the invention, one could create various submixes comprised of different frequencies and compare the effect of the compressor, by selectively inserting and removing the compressor from the signal path. Alternatively, one could experiment with adding or removing certain effects, such as phasing added to one channel corresponding to a particular submix. These comparisons and experiments can be easily made at the mix console, where conventional mixing is controlled, without taking up extra channels in the mix console and without extending the signal path through the mixer.

Figure 10A:
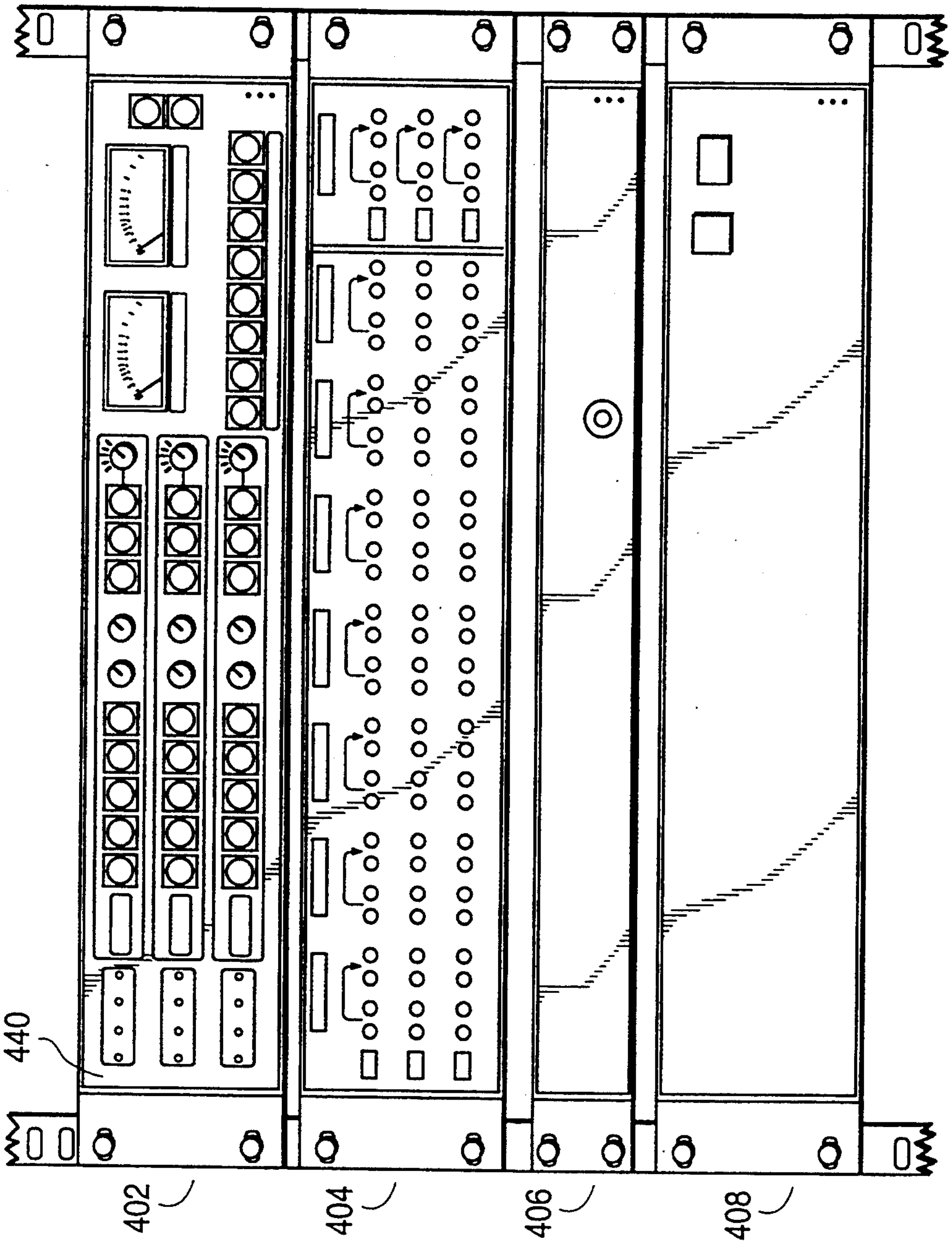
FIG. 10A is a front view of an audio processing system according to a second embodiment of the invention.
Figure 10B:
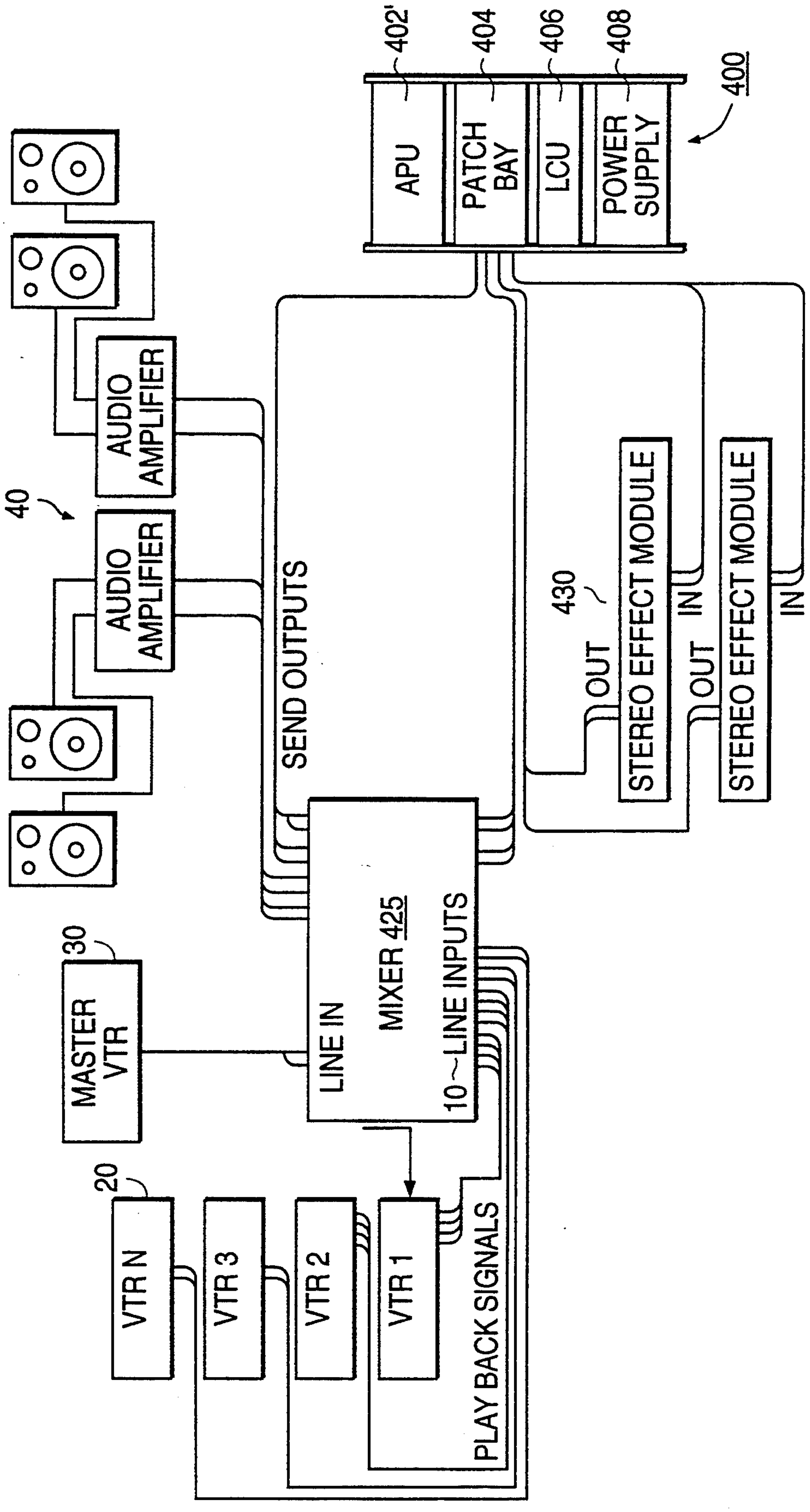
FIG. 10B is a block diagram shown a second embodiment of the invention in a mix down and mastering system.
Figure 11:
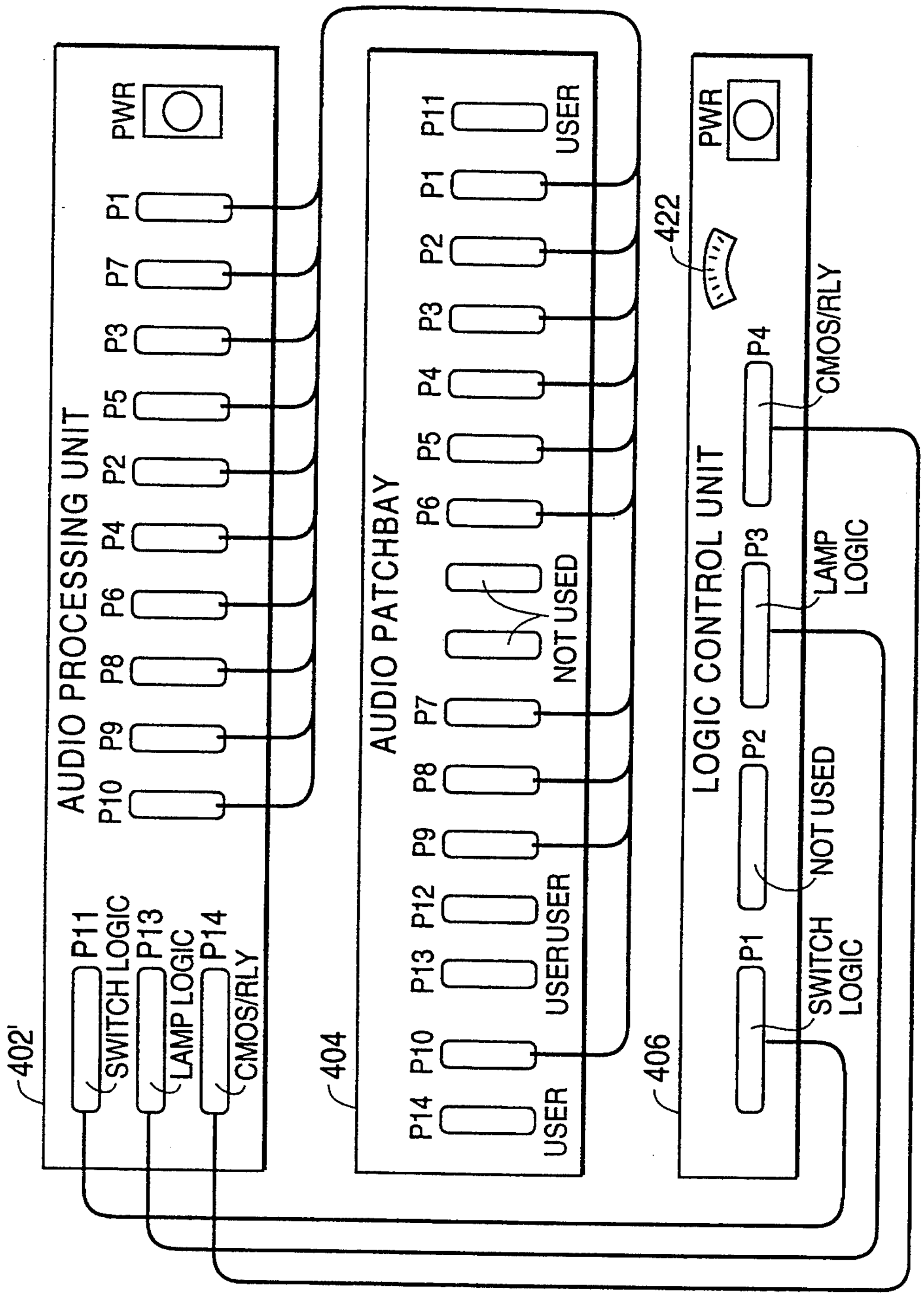
FIG. 11 is a rear view of an audio processing system according to a first embodiment of the invention.

A second embodiment of the invention is shown in FIGS. 10A, 10B and 11. FIG. 10A is a front view of a processing unit according to the invention in which all components of the system are mounted in a standard vertical 19" rack. More specifically, according to this embodiment of the invention, the control switches, the level control members and the VU displays and controls mentioned above are incorporated onto the audio processing unit 402'.

As in the first embodiment, the system according to the second embodiment includes a power supply unit 400, a logic control unit 406, an audio patchbay 404, and an audio processing unit 402'. However, the audio processing unit 402' includes a switch panel portion corresponding to the console switch panel described above and a VU select portion corresponding to the VU console portion. These switches, while arranged differently, are functionally the same as described above. In addition to these components, this embodiment further includes a set of four LEDs per stereo channel 440. These LEDs 440 indicate which of the input and output signals coupled to the audio patchbay are active.

FIG. 10B illustrates this system according to the second embodiment together with a mix console 425 and effect devices 430.

FIG. 11 is a rear view of this second embodiment of the invention except the power supply unit 408 is omitted. As shown, the logic control unit 406 is similarly coupled to the audio processing unit 402. Specifically, switch logic signals indicative of the states of the switches on the switch panel and the VU panel are provided to the logic control unit 406 via ports P11 and P1. In response to these signals, the logic control unit 406 supplies lamp logic signals from port P3 to port P13 of the audio processing unit 402'. The logic control unit 406 further controls the CMOS logic and the relays in the audio processing unit 402' with signals transmitted from port P4 to port P14.

The audio signals from the audio patch bay 404 are coupled to the audio processing unit 402' in the same manner described above.

This embodiment is well suited for applications in which it is not desired to fixedly attach the control panels and display of the processing system to one particular mix console. Instead, the system may be mounted in a portable rack unit so that it may conveniently be used with many different systems, such as the one shown in FIG. 10B.

It is an additional feature of the invention that each unit, which together forms the audio processing system of the invention, utilizes low noise components arranged to maximize "transparency," that is, to permit audio signals to pass through the system without picking up noise or other unwanted components. For example, the units are separated functionally to avoid unwanted signal Coupling and interference, such as interference which might occur between power supply and audio signals. While the components of each unit could be combined into one unit, this would increase the risk of noise, and further make diagnostic and repair procedures more complicated.

Consistent with the goal of providing a transparent system, the audio processing unit is preferably arranged to minimize the introduction of noise, yet be easily constructed with conventional components. For example, the audio processing unit of the preferred embodiment comprises a case, a motherboard, and a number of modules and PC assemblies. Several of these components are described in detail herein in order to demonstrate the techniques by which transparency is accomplished. However, it will be appreciated that many techniques are known in the art to implement the embodiments of the invention previously described.

Figure 12A:
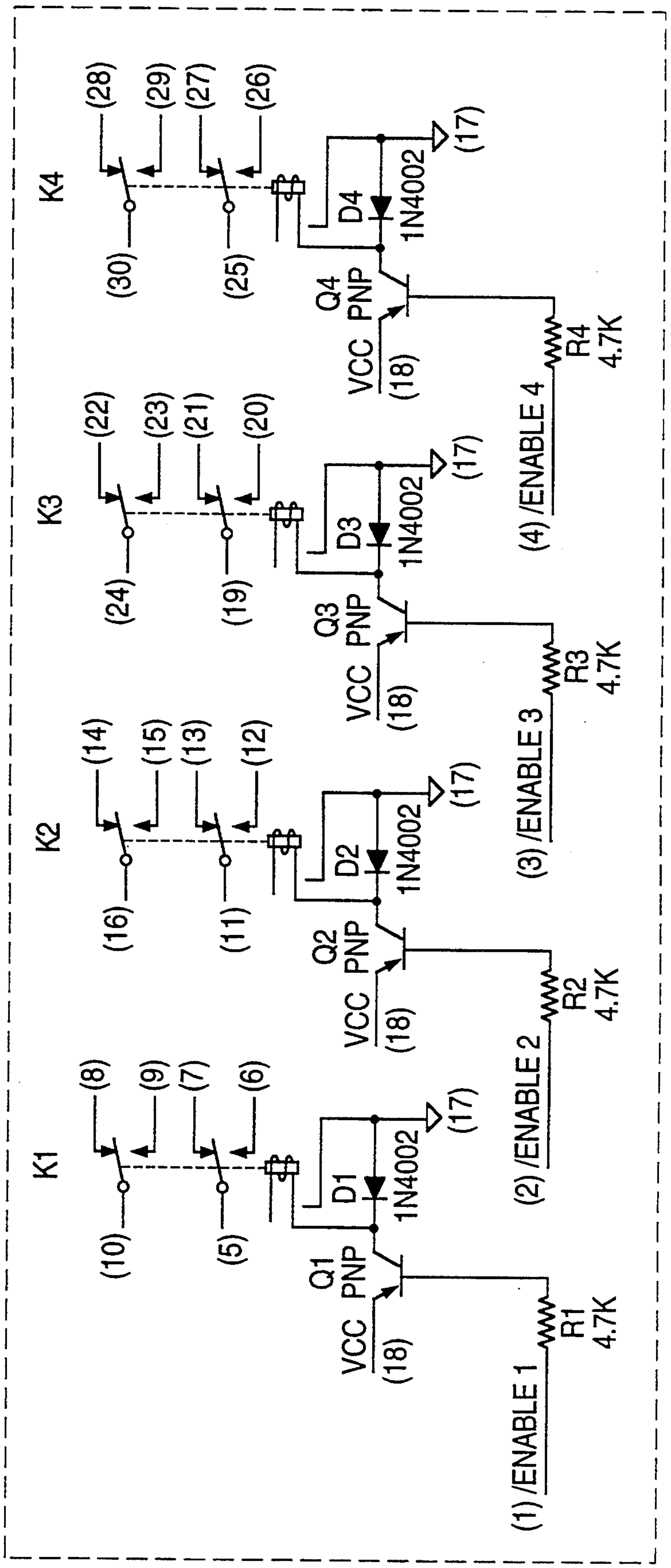
FIG. 12A is a schematic representation of a quad relay module according to one aspect of the invention.

An audio processing unit has been constructed in which four different types of plug-in printed circuit (PC) assembly modules were used to provide the balanced input amplifiers, the balanced output amplifiers, the relay audio switching and the low noise CMOS audio switching shown in FIG. 3. These modules plug into thirty pin edge connectors mounted on a mother board using a gold to gold interface. For example, quad relay modules, shown schematically in FIG. 12A (in which pin connector numbers are shown parenthetically), were used to implement channel CAL and PRE functions.

Figure 12B:
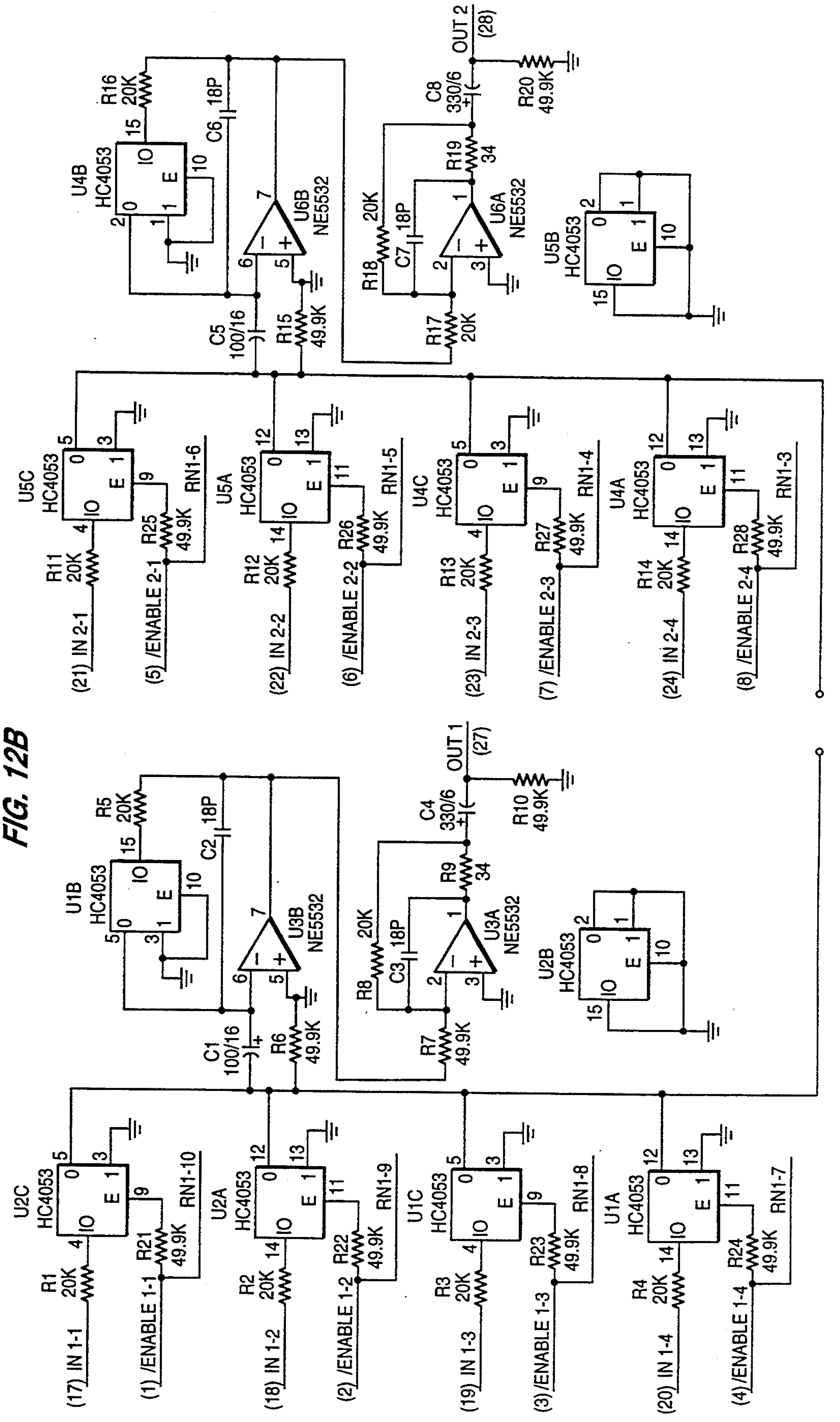
FIG. 12B is a schematic representation of a dual 4×1 CMOS switching module according to another aspect of the invention.
Figure 12C:
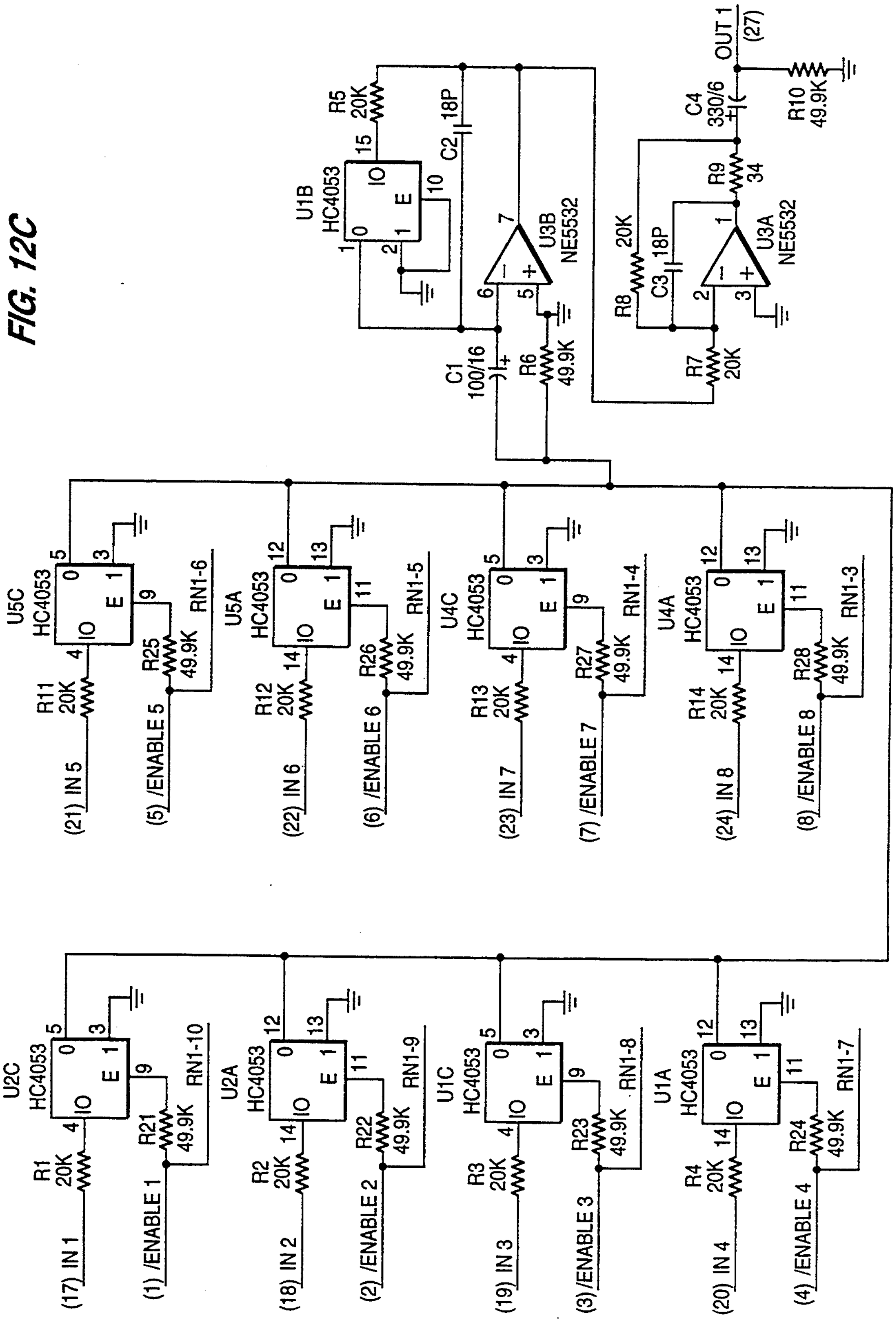
FIG. 12C is a schematic representation of a modified 4×1 CMOS module functioning as a single 8×1 assembly according to another aspect of the invention.

Cut, loopback, and insert functions were implemented with dual 4 by 1 CMOS switching modules, shown in relevant part in FIG. 12B. VU select switching was provided with a modified 4 by 1 CMOS module functioning as a single 8 by 1 assembly as shown in relevant part in FIG. 12C (two such assemblies providing left and right VU source selection).

Figure 12D:
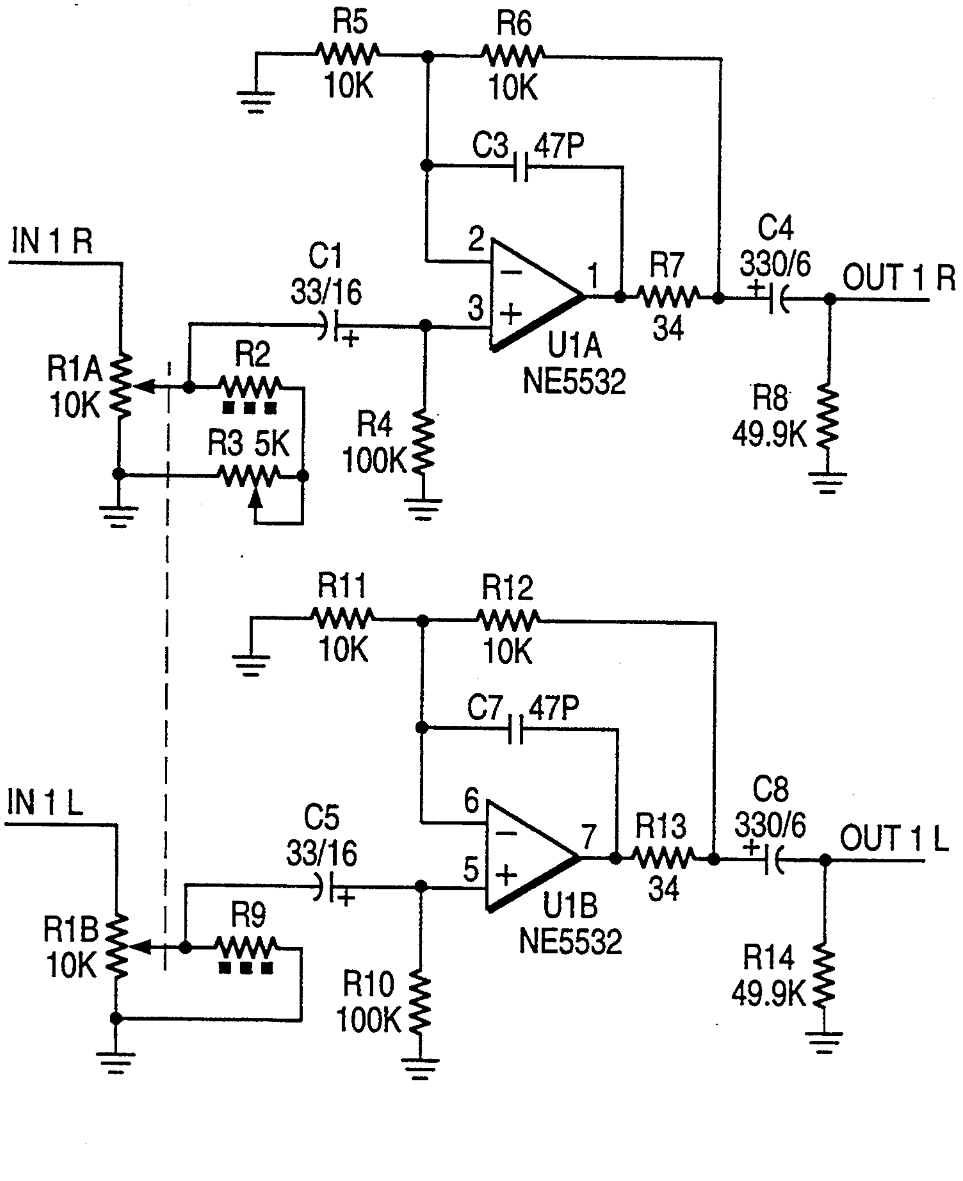
FIG. 12D is a schematic representation of an insert control level assembly according to still another aspect of the invention.

In the audio processing unit according to the second embodiment of the invention, the front panel main and insert level control assemblies utilized buffer amplifiers mounted directly onto the printed circuit board (PCB), in proximity to the associated level potentiometer. However, as shown schematically in FIG. 12D (one stereo channel only), the low output impedance provided by such buffer amplifiers allows the level control assemblies to be mounted remotely on the control console without risk of audio quality degradation. Loading resistors on the potentiometer arms control pot taper. Additional trim potentiometers on the right path allow matching the right side 0 dB to the fixed left side 0 dB position.

The audio processing unit of the preferred embodiment further utilizes individual routing, level and VU select switching assemblies which interface directly with the logic control unit as mentioned above. Each of these assemblies include two ribbon cable connectors, one for sending switch closures to the logic control unit, the other for receiving lamp control logic from the logic control unit. According to the preferred embodiment, switch closure and lamp logic are totally separate and under software control of the logic control unit. However, the +10 dB and +16 dB VU range select switches described above are not under control of the logic control unit, but have local logic control. The switches for these functions may be independently toggled on and off, and are electrically interlocked.

Figure 13:
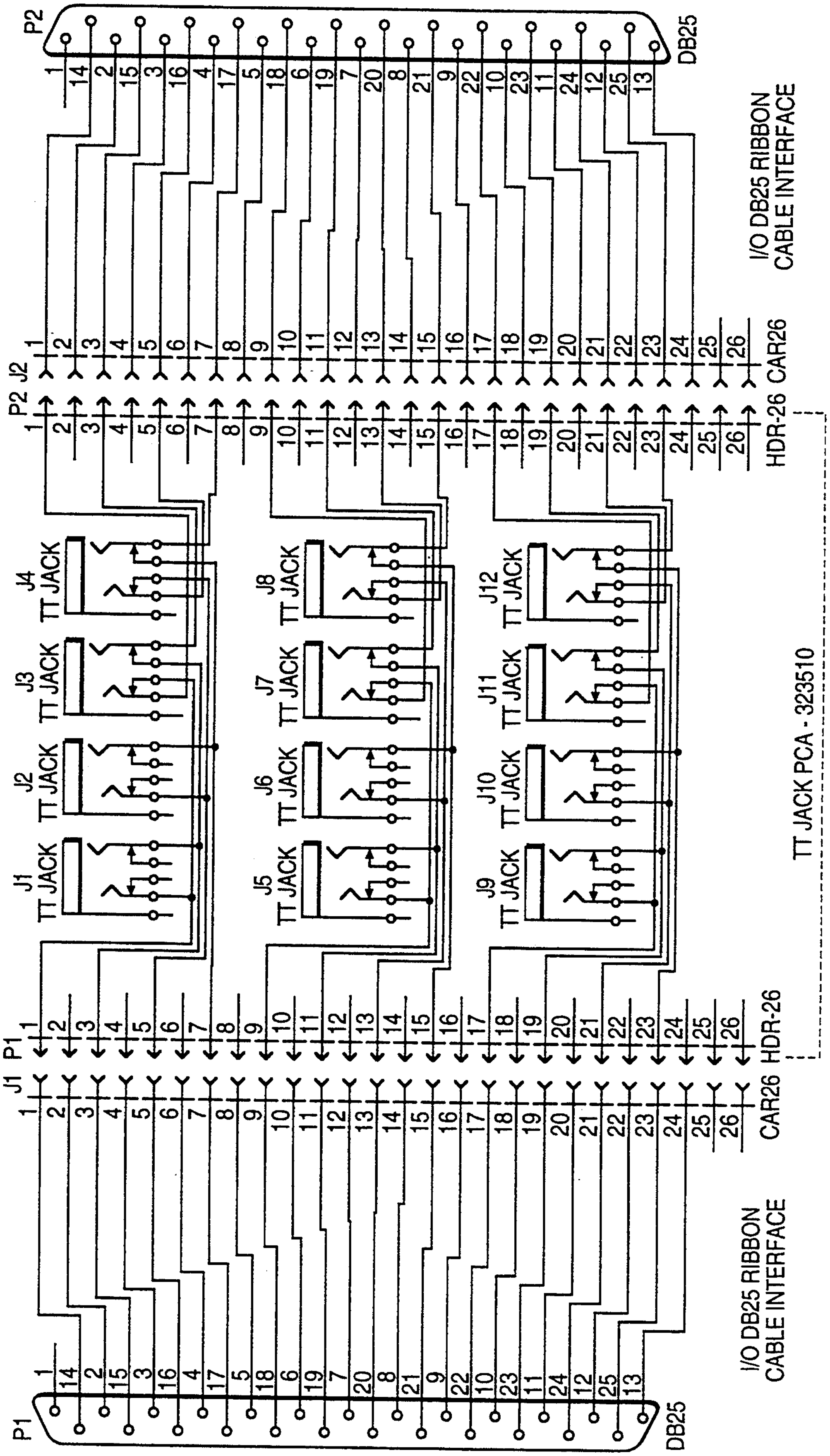
FIG. 13 is a partial schematic representation of a patch bay unit according to the invention.

FIG. 13 is a partial schematic representation of the patch bay unit of the preferred embodiment. As shown, all input, output, and insert patching are provided in the one unit. Ten rear mounted D25 connectors, such as those shown, interface all of the system audio to the audio processing unit. Four additional D25 connectors provide external (user) audio interfaces.

The patch bay itself is divided into eight assemblies of twelve jacks each. Each of these twelve jack assemblies includes three pairs of MULT to NORM patching. Each jack assembly is ribbon cable connected to two corresponding D25 interface connectors.

The logic control unit was constructed with a G2 Design Works Z80 based microcontroller and multiport I/O assembly. The architecture of this processor includes EPROM and battery-backed RAM storage devices. In the model constructed, a control logic table for the system is contained in code downloaded once into the battery backed RAM. Proprietary firmware supplied by Signus Corporation is stored in the on-board EPROM and initializes the processor and the audio system. This firmware also utilizes the table downloaded in RAM to control all panel switch logic, audio logic, and lamp logic in the APU.

It is an additional feature of the invention that the logic control unit be able to be reconfigured so that the switches described above can be assigned different functions, thereby further increasing the flexibility of the system. In the model constructed according to the invention, a standard DB9 RS-232 serial port 422 was provided on the rear panel of the logic control unit 406 in order to allow downloading of a new logic table should any changes be desired. Using the proprietary software referred to above, the control table of this model can be recorded and a new file provided. This can be accomplished with known methods, for example, by utilizing programmable logic circuits (PA2) and reconfiguring with a MS-DOS communications program dedicated to the logic control unit download.

As mentioned above, the logic control unit according to the preferred embodiment includes three rear mounted D37 connectors which interface the unit's switch closure logic, switch lamp logic, and the CMOS control logic with the audio processing unit. An additional RS232 D9 connector may also be included for downloading new software and running diagnostics.

It will be appreciated by those skilled in the art, that these examples are merely illustrative. Various alternative embodiments are apparent. However, the preferred embodiment of the invention described above offers many advantages, such as "transparency" and adaptability to other uses.

The foregoing makes apparent that in accordance with the present invention, an apparatus that fully satisfies the objectives, aims and advantages thereof is described. It would be appreciated that while the invention has been described in the context of specific embodiments, many alternatives, modifications, permutations and variations thereon will become apparent to those skilled in the art in light of the foregoing descriptions.

Accordingly, it is intended that the present invention embrace all such alternatives, modifications and variations as falling within the scope of the appended claims.

What is claimed is:

1. An audio processing system comprising:

a plurality of input terminals for receiving audio signals from one or more audio sources, said plurality of input terminals including return terminals for receiving return audio signals from one or more external processing devices;

a plurality of output terminals for providing processed audio signals, said output terminals including send terminals for providing audio signals to one or more external processing devices;

a plurality of audio signal paths each having an input portion coupled to a corresponding number of said input terminals, an insert portion, and an output portion coupled to a corresponding number of said output terminals, wherein each said output portion is selectively coupled to each input portion of said plurality of audio signal paths through a first plurality of logic controlled switches, whereby each of said plurality of audio signal paths are looped back in series with one or more others of said plurality of audio signal paths;

at least one additional audio signal path arranged in parallel with each insert portion of said plurality of audio signal paths, said additional audio path including one of said send terminals and one of said return terminals whereby at least one audio insert point is provided on said at least one additional audio signal path;

a second plurality of logic controlled switches arranged in series with each additional audio signal path and each insert portion of said plurality of audio signal paths; and logic control means for providing logic signals which selectively open and close each of said first plurality of logic controlled switches and each of said second plurality of logic controlled switches in response to the operation of a corresponding number of switch operating members.

2. The audio processing system of claim 1 wherein said plurality of audio signal paths are each balanced stereo audio paths.

3. The audio processing system of claim 1 wherein said one or more audio sources is provided to said plurality of input terminals from an audio mix console.

4. The audio processing system of claim 1 wherein said one or more external processing devices selectively add effects to said audio signals at said insert points.

5. The audio processing system of claim 1 wherein two additional audio paths are each arranged in parallel with each insert portion of said plurality of audio signal paths, whereby two audio insert points are provided on said at least one additional audio signal path.

6. The audio processing system of claim 1 further comprising a plurality of LEDs, each indicating a position of one of said plurality of switch operating members which correspond to said first and second plurality of logic controlled switches.

7. The audio processing system of claim 1 wherein said logic control means is programmable.

8. The audio processing system of claim 1 wherein said plurality of audio signal paths further include:

a first level control circuit located in series between said input portion and said insert portion and a second level control circuit located in series between said insert portion and said output portion, said first and second control circuits adjusting signal level of audio signals coupled thereto;

a control member for manually adjusting said signal level; and a third plurality of logic controlled switches for selectively inserting and removing said first level control circuit and said second level control circuit from the audio signal path according to additional logic signals provided by logic control means, said additional logic signals being generated in response to level control switch operating members;

whereby level control of an audio signal supplied to each said plurality of audio signal paths are adjusted before or after each said insert portion.

9. The audio processing system of claim 8 wherein said logic control means supplies logic signals to said first level control circuit and said second level control circuit which sets the gain of both level control circuits to a substantially equally level, whereby a balanced level is maintained before and after each said insert point.

10. The audio processing system of claim 1 further including:

at least one VU meter for displaying the level of an audio signal;

a plurality of level inputs which supply signals from select points located on said plurality of audio signal paths, including each said input portion and each said output portion; and a plurality of logic controlled VU input switches which selectively couple said plurality of level inputs to said at least one VU meter according to level logic control signals supplied from said logic control means, said level logic control signals being selectively supplied according to the operation of a plurality of level control switch operating members.

11. The audio processing system of claim 10 further comprising a plurality of LEDs, each indicating a position of one of said plurality of switch operating members which correspond to said first and second plurality of logic controlled switches and said plurality of level control switch operating member, and wherein said logic control means includes:

a first logic circuit for detecting a logic state of said plurality of switch operating members which correspond to said first and second plurality of logic controlled switches and a logic state of said plurality of level control switch operating members;

a second logic circuit for supplying said logic signals to said first and second plurality of logic controlled switches and to said logic controlled VU input switches; and a third logic circuit for providing driving signals to said LEDs.

12. An audio processing system comprising:

a plurality of input terminals for receiving audio signals from one or more audio sources, said plurality of input terminals including return terminals for receiving return audio signals from one or more external processing devices;

a plurality of output terminals for providing processed audio signals, said output terminals including send terminals for providing audio signals to one or more external processing devices;

a plurality of audio signal paths each having an input portion coupled to a corresponding number of said input terminals, an insert portion, and an output portion coupled to a corresponding number of said output terminals, wherein each said output portion is selectively coupled to each input portion of said plurality of audio signal paths through a first plurality of logic controlled switches, whereby each of said plurality of audio signal paths are looped back in series with the one or more others of said plurality of audio signal paths;

at least one additional audio signal path arranged in parallel with each insert portion of said plurality of audio signal paths, said additional audio path including one of said send terminals and one of said return terminals whereby at least one audio insert point is provided on said at least one additional audio signal path;

a second plurality of logic controlled switches arranged in series with each additional audio signal path and each insert portion of said plurality of audio signal paths;

logic control means for providing logic signals which selectively open and close each of said first plurality of logic controlled switches and each of said second plurality of logic controlled switches in response to the operation of a corresponding number of switch operating members;

an audio processing unit in which said plurality of audio signal paths are located, said audio processing unit including a plurality of audio ports for receiving said audio signals and logic ports for receiving said logic signals;

a patchbay unit on which said plurality of input terminals and said plurality of output terminals, are provided, said plurality of input terminals and said plurality of output terminals being operatively coupled to said audio processing unit with one or more connectors coupled to said audio ports;

a logic control unit in which said logic control means are provided, said logic control unit including a plurality of ports for supplying said logic signals to said logic ports of said audio processing unit;

a display panel on which said switch operating members are provided; and a power supply unit for providing power to said audio processing unit and said logic control unit.

13. The audio processing system of claim 12 wherein said audio processing unit, said audio patchbay unit, said logic control unit and said power supply unit are provided with mounting brackets whereby they are mounted in a rack.

14. The audio processing system of claim 12 wherein said one or more audio sources is provided to said audio patchbay from an audio mix console, and said display panel is provided on a display portion of said audio mix console.

15. The audio processing system of claim 12 wherein said one or more audio sources is provided to said audio patchbay from an audio mix console, and wherein the audio processing system further comprises:

at least one VU meter for displaying the level of an audio signal;

a plurality of level inputs which supply signals from select points located on said plurality of audio signal paths, including each said input portion and each said output portion; and a plurality of logic controlled VU input switches which selectively couple said plurality of level inputs to said at least one VU meter according to level logic control signals supplied from said logic control means, said level logic control signals being selectively supplied according to the operation of a plurality of level control switch operating members, said at least one VU meter and said plurality of level control switch operating members being included on a VU panel;

wherein said display panel and said VU panel are provided on a display portion of said audio mix console.

16. The audio processing system of claim 12 wherein said display panel is provided on a display portion of said audio processing unit.

17. The audio processing system of claim 12 further comprising:

at least one VU meter for displaying the level of an audio signal;

a plurality of level inputs which supply signals from select points located on said plurality of audio signal paths, including each said input portion and each said output portion; and a plurality of logic controlled VU input switches which selectively couple said plurality of level inputs to said at least one VU meter according to level logic control signals supplied from said logic control means, said level logic control signals being selectively supplied according to the operation of a plurality of level control switch operating members, said at least one VU meter and said plurality of level control switch operating members being included on a VU panel;

wherein said display panel and said VU panel are provided on a display portion of said audio processing unit.

18. The audio processing system of claim 12 wherein said plurality of audio signal paths are each balanced stereo audio paths.

19. The audio processing system of claim 12 wherein said one or more audio sources is provided to said audio patchbay from an audio mix console.

20. The audio processing system of claim 12 wherein said one or more external processing devices selectively add effects to said audio signals at said insert points.

21. The audio processing system of claim 12 wherein two additional audio paths are each arranged in parallel with each insert portion of said plurality of audio signal paths, whereby two audio insert points are provided on said at least one additional audio signal path.

22. The audio processing system of claim 12 further comprising a plurality of LEDs, each indicating a position of one of said plurality of switch operating members which correspond to said first and second plurality of logic controlled switches.

23. The audio processing system of claim 12 wherein said logic control unit includes a serial port, said serial port connecting said logic control unit to a means for programming said logic control means.

24. The audio processing system of claim 12 wherein said plurality of audio signal paths further include:

a first level control circuit located in series between said input portion and said insert portion and a second level control circuit located in series between said insert portion and said output portion, said first and second control circuits adjusting signal level of audio signals coupled thereto;

a control member for manually adjusting said signal level; and a third plurality of logic controlled switches for selectively inserting and removing said first level control circuit and said second level control circuit from the audio signal path according to additional logic signals provided by logic control means, said additional logic signals being generated in response to level control switch operating members;

whereby level control of an audio signal supplied to each said plurality of audio signal paths are adjusted before or after each said insert portion.

25. The audio processing system of claim 24 wherein said logic control means supplies logic signals to said first level control circuit and said second level control circuit which sets the gain of both level control circuits to a substantially equally level, whereby a balanced level is maintained before and after each said insert point.

26. The audio processing system of claim 12 further including:

at least one VU meter for displaying the level of an audio signal;

a plurality of level inputs which supply signals from select points located on said plurality of audio signal paths, including each said input portion and each said output portion; and a plurality of logic controlled VU input switches which selectively couple said plurality of level inputs to said at least one VU meter according to level logic control signals supplied from said logic control means, said level logic control signals being selectively supplied according to the operation of a plurality of level control switch operating members.

27. The audio processing system of claim 26 further comprising a plurality of LEDs, each indicating a position of one of said plurality of switch operating members which correspond to said first and second plurality of logic controlled switches and said plurality of level control switch operating member, and wherein said logic control means includes:

a first logic circuit for detecting a logic state of said plurality of switch operating members which correspond to said first and second plurality of logic controlled switches and a logic state of said plurality of level control switch operating members;

a second logic circuit for supplying said logic signals to said first and second plurality of logic controlled switches and to said logic controlled VU input switches; and a third logic circuit for providing driving signals to said LEDs.

28. The audio processing system of claim 27 wherein said first and second plurality of logic controlled switches consist of CMOS components.

* * * * *